(12) United States Patent
Shimada et al.

(10) Patent No.: US 10,527,827 B2
(45) Date of Patent: Jan. 7, 2020

(54) ZOOM LENS AND IMAGING APPARATUS

(71) Applicant: FUJIFILM Corporation, Tokyo (JP)

(72) Inventors: Yasutaka Shimada, Saitama (JP);
Taiga Noda, Saitama (JP)

(73) Assignee: FUIIFILM Corporation, Tokyo (JP)

( * ) Notice: Subject to any disclaimer, the term of this patent is extended or adjusted under 35 U.S.C. 154(b) by 74 days.

(21) Appl. No.: 15/843,061

(22) Filed: Dec. 15, 2017

(65) Prior Publication Data

US 2018/0239119 A1 Aug. 23, 2018

(30) Foreign Application Priority Data

Feb. 17, 2017 (JP) .................................. 2017-028102

(51) Int. Cl.
| | |
|---|---|
| *G02B 15/14* | (2006.01) |
| *G02B 27/00* | (2006.01) |
| *G02B 13/02* | (2006.01) |
| *G02B 15/167* | (2006.01) |

(52) U.S. Cl.
CPC ........... *G02B 15/142* (2019.08); *G02B 13/02* (2013.01); *G02B 15/167* (2013.01); *G02B 27/0025* (2013.01)

(58) Field of Classification Search
CPC .... G02B 13/02; G02B 15/161; G02B 15/167; G02B 15/16; G02B 15/163; G02B 15/17; G02B 15/173; G02B 15/20; G02B 15/22; G02B 15/24; G02B 27/0025
USPC .......................... 359/688, 676, 695, 683, 745
See application file for complete search history.

(56) References Cited

U.S. PATENT DOCUMENTS

| | | | | |
|---|---|---|---|---|
| 6,055,114 A | * | 4/2000 | Ohtake .................. | G02B 15/17 359/676 |
| 8,416,502 B2 | | 4/2013 | Takahashi | |
| 9,539,239 B1 | | 1/2017 | Zack et al. | |
| 9,715,093 B2 | | 7/2017 | Ikeda et al. | |
| 2009/0174949 A1 | * | 7/2009 | Watanabe ............ | G02B 15/173 359/687 |
| 2011/0317279 A1 | * | 12/2011 | Takahashi ............ | G03B 21/006 359/683 |
| 2015/0247997 A1 | * | 9/2015 | Nagatoshi ............ | G02B 15/173 359/683 |

FOREIGN PATENT DOCUMENTS

| | | |
|---|---|---|
| JP | 5539062 B2 | 7/2014 |
| JP | 5841270 B2 | 1/2016 |
| JP | 2016-071140 A | 5/2016 |

* cited by examiner

*Primary Examiner* — Travis S Fissel
(74) *Attorney, Agent, or Firm* — Studebaker & Brackett PC

(57) ABSTRACT

The zoom lens consists of, in order from the object side, a first lens group that has a positive refractive power and remains stationary during zooming, a second lens group that moves during zooming, and a subsequent lens group. The first lens group has a negative lens at a position closest to the object side. The subsequent lens group has, successively in order from a position closest to the image side, a final positive lens group that remains stationary during zooming, a positive lens group that moves during zooming, a stop, and a negative lens group that moves during zooming. The stop moves integrally with the positive lens group during zooming. The stop first moves to the object side, and reversely moves during zooming from the wide-angle end to the telephoto end. Predetermined conditional expressions are satisfied.

20 Claims, 13 Drawing Sheets

EXAMPLE 1

EXAMPLE 1

EXAMPLE 1

WIDE-ANGLE END

FIRST MIDDLE

SECOND MIDDLE

TELEPHOTO END

EXAMPLE 2

EXAMPLE 2

WIDE-ANGLE END

FIRST MIDDLE

SECOND MIDDLE

TELEPHOTO END

EXAMPLE 3

EXAMPLE 3

WIDE-ANGLE END

FIRST MIDDLE

SECOND MIDDLE

TELEPHOTO END

EXAMPLE 4

EXAMPLE 4

WIDE-ANGLE END

FIRST MIDDLE

SECOND MIDDLE

TELEPHOTO END

ZOOM LENS AND IMAGING APPARATUS

CROSS-REFERENCE TO RELATED APPLICATIONS

The present application claims priority under 35 U.S.C. § 119 to Japanese Patent Application No. 2017-028102, filed on Feb. 17, 2017. The above application is hereby expressly incorporated by reference, in its entirety, into the present application.

BACKGROUND OF THE INVENTION

1. Field of the Invention

The present invention relates to a zoom lens suitable for electronic cameras such as broadcast cameras, movie imaging cameras, digital cameras, video cameras, and surveillance cameras, and to an imaging apparatus comprising the zoom lens.

2. Description of the Related Art

In the related art, zoom lenses, each of which is compact and lightweight and has a high zoom ratio, are demanded for broadcast cameras, movie imaging cameras, digital cameras, and the like. As a lens system that fulfills such a demand, a zoom lens of a type in which a lens group having a positive refractive power is disposed to be closest to the object side and the total length of the lens system is invariable during zooming is known. For example, zoom lenses of the above type are described in JP2016-071140A, JP5841270B, and JP5539062B.

SUMMARY OF THE INVENTION

In the above-mentioned cameras, in order to deal with imaging modes that focus on maneuverability and operability, a more compact and lighter camera is required. However, in the zoom lens mounted on the camera, in a case where the zoom ratio is increased, the lens group closest to the object side tends to become greatly heavy. Since the lens group closest to the object side is heavier in the whole lens system, it is preferable to reduce the size of this lens group. In other words, it is preferable to achieve reduction in size and weight while ensuring the zoom ratio necessary for the camera. In addition, in recent years, as the number of pixels of an imaging element used in combination with a zoom lens has increased, there has been a demand for a zoom lens in which aberration is more accurately corrected.

However, the lens system described in JP2016-071140A has a disadvantage that it is not easy to reduce the weight since the total length of the lens system is long and the outer diameter of the lens group closest to the object side is large as compared with the recent demand. The lens system described in JP5841270B also has a disadvantage that it is not easy to reduce the weight since the total length of the lens system is long and the thickness and the outer diameter of the lens group closest to the object side are large as compared with the recent demand. Since the lens system described in JP5539062B is assumed to be used in projection, there is a disadvantage that the zoom ratio is low.

The present invention has been made in consideration of the above-mentioned situation, and its object is to provide a zoom lens, which has high optical performance since reduction in size and weight is achieved and various aberrations are satisfactorily corrected while a high zoom ratio is secured, and an imaging apparatus comprising the zoom lens.

A zoom lens of the present invention consists of, in order from an object side to an image side: a first lens group that has a positive refractive power and remains stationary with respect to the image plane during zooming; a second lens group that has a negative refractive power and moves during zooming; and a subsequent lens group that has a distance between the subsequent lens group and the second lens group in a direction of an optical axis changing during zooming. The first lens group has at least one positive lens, and a negative lens is disposed to be closest to the object side in the first lens group. The subsequent lens group has, successively in order from a position closest to the image side to the object side, a final lens group that has a positive refractive power and remains stationary with respect to an image plane during zooming, a positive lens group that moves during zooming, a stop that moves integrally with the positive lens group during zooming, and a negative lens group that moves by changing a distance between the negative lens group and the stop in the direction of the optical axis during zooming. The stop first moves to the object side and thereafter reversely moves to the image side along the optical axis in a case of zooming from a wide-angle end to a telephoto end. Assuming that a distance on the optical axis from a lens surface closest to the object side in the first lens group to a lens surface closest to the image side in the first lens group is DG1 and an amount of movement of the stop in the direction of the optical axis from the wide-angle end to a first middle focal length state in a case where the first middle focal length state is a state where the stop reversely moves is Dwm1, Conditional Expression (1) is satisfied.

$$3 < DG1/Dwm1 < 6 \tag{1}$$

It is preferable that the zoom lens of the present invention satisfies Conditional Expression (1-1).

$$3.5 < DG1/Dwm1 < 5.5 \tag{1-1}$$

In the zoom lens of the present invention, assuming that a focal length of the first lens group is f1 and a focal length of the negative lens closest to the object side in the first lens group is fL1, it is preferable that Conditional Expression (2) is satisfied, and it is more preferable that Conditional Expression (2-1) is satisfied.

$$-0.8 < f1/fL1 < -0.6 \tag{2}$$

$$-0.78 < f1/fL1 < -0.62 \tag{2-1}$$

In the zoom lens of the present invention, assuming that a refractive index of the negative lens closest to the object side in the first lens group at a d line is NL1 and an average of refractive indices of all positive lenses in the first lens group at the d line is Nave1p, it is preferable that Conditional Expression (3) is satisfied, and it is more preferable that Conditional Expression (3-1) is satisfied.

$$0.11 < NL1 - Nave1p < 0.26 \tag{3}$$

$$0.15 < NL1 - Nave1p < 0.24 \tag{3-1}$$

In the zoom lens of the present invention, assuming that a focal length of the whole system at the first middle focal length state is fm1, a focal length of the whole system at the wide-angle end is fw, and a focal length of the whole system at the telephoto end is ft, it is preferable that the following relationship is satisfied.

$$fw < fm1 < (fw \times ft)^{1/2}$$

In the zoom lens of the present invention, assuming that a sum of a distance on the optical axis from a lens surface closest to the object side to a lens surface closest to the image side and an air-converted distance on the optical axis from the lens surface closest to the image side to the image plane is TL and a focal length of the whole system at the telephoto end is ft, it is preferable that Conditional Expression (4) is satisfied, and it is more preferable that Conditional Expression (4-1) is satisfied.

$$1<TL/ft<1.6 \tag{4}$$

$$1.2<TL/ft<1.56 \tag{4-1}$$

In the zoom lens of the present invention, assuming that a composite focal length of the negative lens group, the positive lens group, and the final lens group at the wide-angle end is frw and a focal length of the whole system at the wide-angle end is fw, it is preferable that Conditional Expression (5) is satisfied.

$$4.5<frw/fw<6 \tag{5}$$

In the zoom lens of the present invention, it is preferable that the focusing is performed by moving a part of lenses in the first lens group.

In the zoom lens of the present invention, it is preferable that the negative lens group consists of a negative lens and a positive lens in order from the object side. In this case, assuming that an Abbe number of the negative lens of the negative lens group at the d line is νn and an Abbe number of the positive lens of the negative lens group at the d line is νp, it is preferable that Conditional Expression (6) is satisfied, and it is more preferable that Conditional Expression (6-1) is satisfied.

$$10<\nu n-\nu p<25 \tag{6}$$

$$15<\nu n-\nu p<20 \tag{6-1}$$

In the zoom lens of the present invention, it is preferable that the stop first moves to the image side and reversely moves to the object side along the optical axis during zooming from the first middle focal length state to the telephoto end. In this case, assuming that a focal length of the whole system in a case where the stop reversely moves from the image side to the object side is fm2, a focal length of the whole system at the wide-angle end is fw, and a focal length of the whole system at the telephoto end is ft, it is preferable that the following relationship is satisfied.

$$(fw \times ft)^{1/2}<fm2<ft$$

In the zoom lens of the present invention, it is preferable that the first lens group consists of three or more positive lenses.

The zoom lens of the present invention may consist of: the stop; and five and six lens groups that are configured such that distances of lens groups adjacent to each other change during zooming.

In the zoom lens of the present invention, it is preferable that assuming that an average of Abbe numbers of all positive lenses of the first lens group at the d line is vave1p, Conditional Expression (7) is satisfied.

$$67<vave1p<90 \tag{7}$$

An imaging apparatus of the present invention comprises the zoom lens of the present invention.

In the present description, it should be noted that the terms "consisting of ~" and "consists of ~" mean that the imaging lens may include not only the above-mentioned elements but also lenses substantially having no powers, optical elements, which are not lenses, such as a stop, a filter, and a cover glass, and mechanism parts such as a lens flange, a lens barrel, an imaging element, and a hand shaking correction mechanism.

It should be noted that the "~ group having a positive refractive power" and the "positive lens group" means that the group has a positive refractive power as a whole. Likewise, the "~ group having a negative refractive power" and the "negative lens group" means that the group has a negative refractive power as a whole. The "lens group" is not necessarily composed of a plurality of lenses, but may be composed of only one lens. Signs of refractive powers of the lens groups and signs of refractive powers of the lenses are assumed as those in paraxial regions in a case where some lenses have aspheric surfaces. All the conditional expressions are based on the d line (a wavelength of 587.56 nm (nanometers)) in a state where an object at infinity is in focus.

According to the present invention, the zoom lens consists of, in order from the object side, first lens group that has a positive refractive power and remains stationary during zooming, a second negative lens group that moves during zooming, and a subsequent lens group. In the zoom lens, by suitably setting the configuration of the subsequent lens group, the position of the stop, and the direction of movement of the stop during zooming, predetermined conditional expressions are satisfied. Thereby, it is possible to provide a zoom lens, which has high optical performance since reduction in size and weight is achieved and various aberrations are satisfactorily corrected while a high zoom ratio is secured, and an imaging apparatus comprising the zoom lens.

DESCRIPTION OF THE PREFERRED EMBODIMENTS

Figure 1:
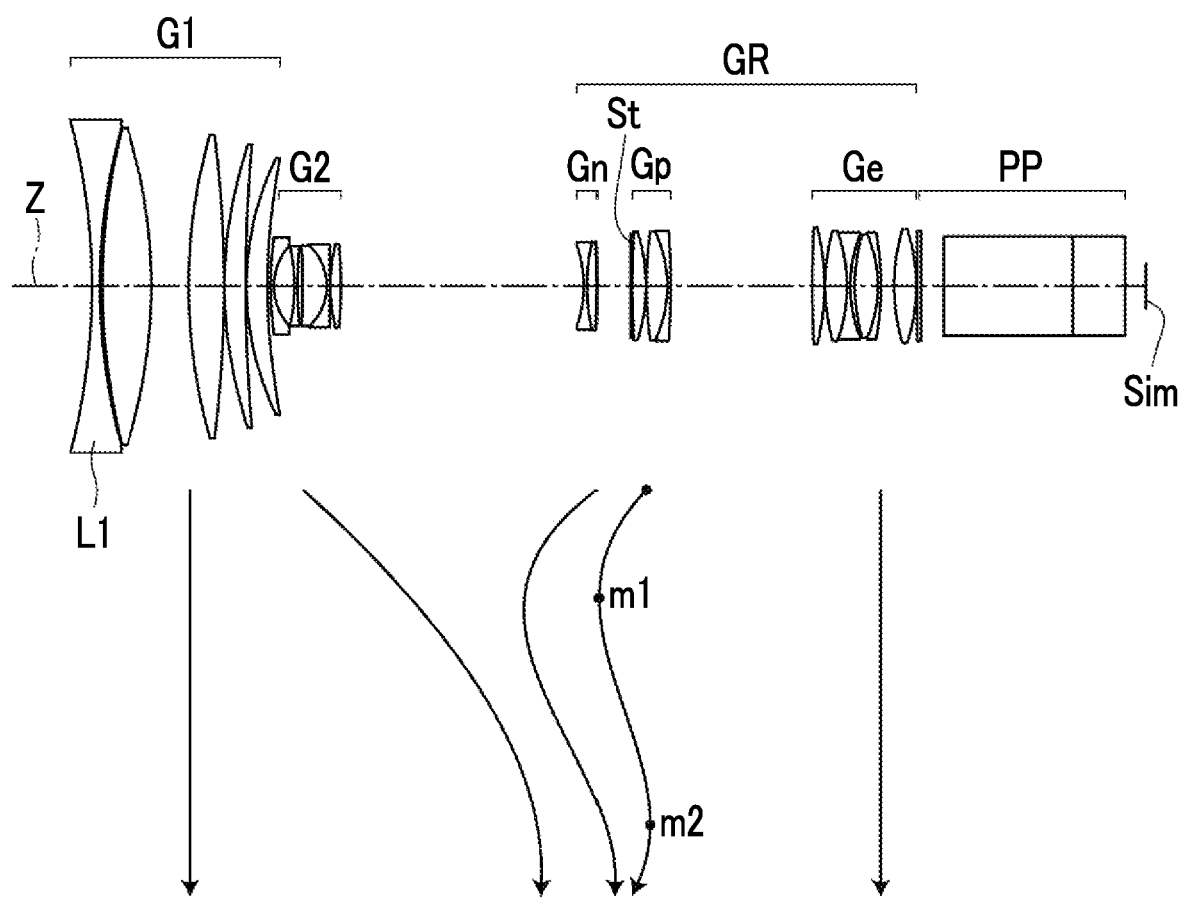
FIG. 1 is a cross-sectional view illustrating a lens configuration and a movement locus of a zoom lens of Example 1 of the present invention at the wide-angle end.
Figure 2:
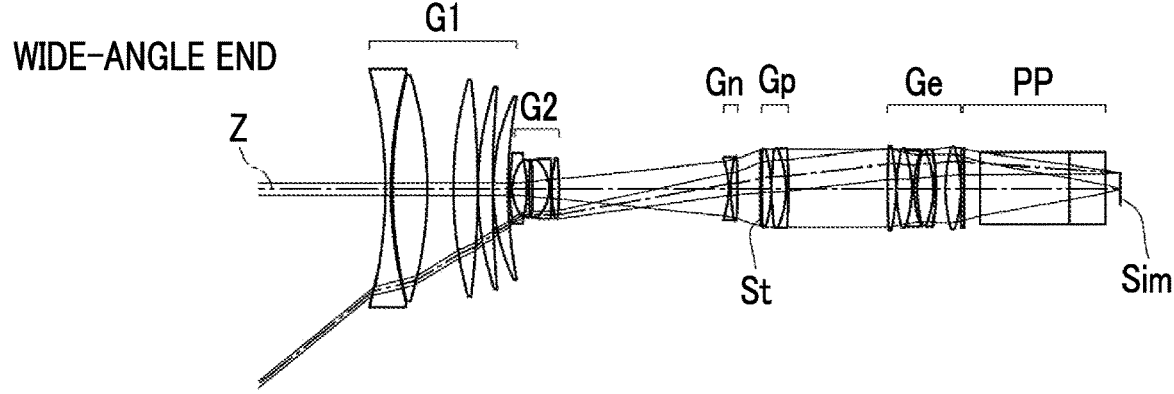
FIG. 2 is a cross-sectional view illustrating a configuration and optical paths of the zoom lens of Example 1 of the present invention at the wide-angle end, the first middle focal length state, the second middle focal length state, and the telephoto end.
Figure 2:
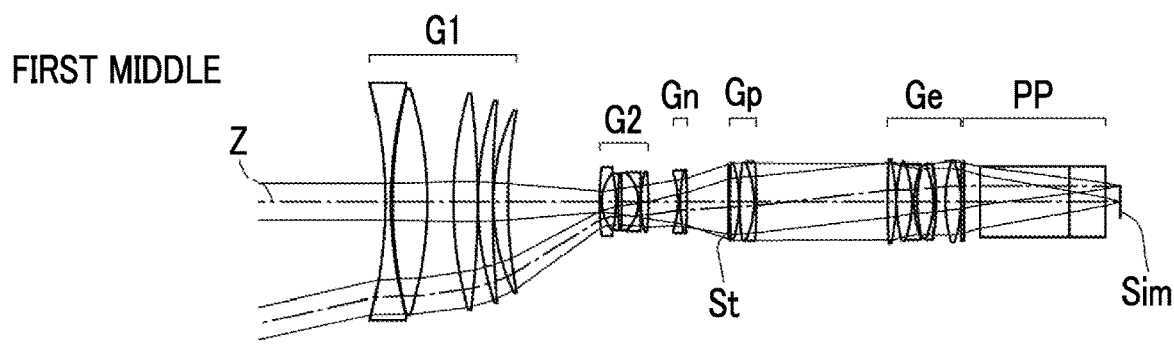
Figure 2:
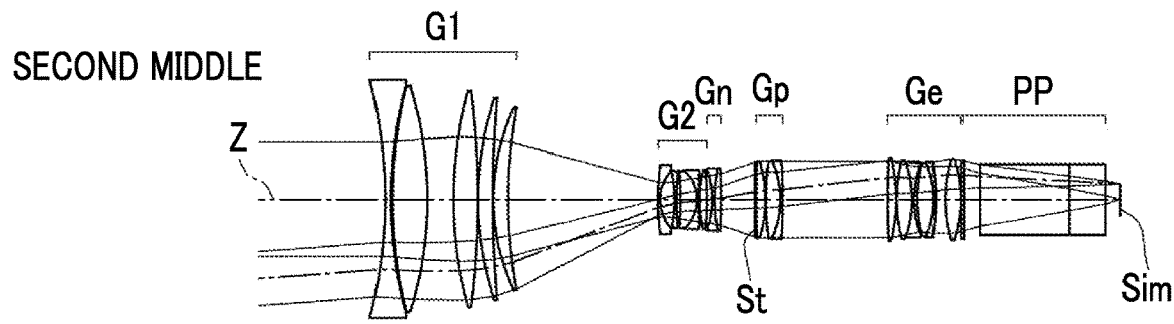
Figure 2:
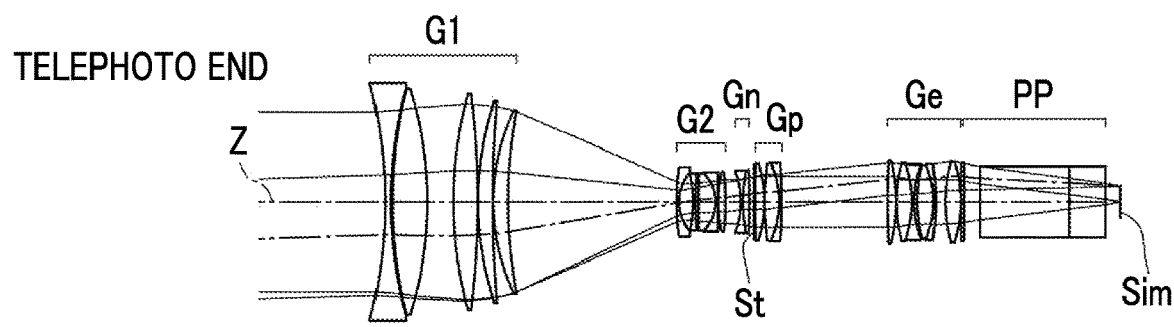

Hereinafter, embodiments of the present invention will be described with reference to drawings. FIG. 1 is a cross-sectional view illustrating a lens configuration of a zoom lens of an embodiment of the present invention at the wide-angle end. FIG. 2 is a cross-sectional view illustrating a lens configuration and optical paths of the zoom lens in the respective states. The examples shown in FIGS. 1 and 2 correspond to the zoom lens of Example 1 to be described later. FIGS. 1 and 2 each show a state where the object at infinity is in focus, where the left side of the drawing is the object side and the right side of the drawing is the image side.

In FIG. 1, under each lens group, a movement locus of each lens group during zooming from the wide-angle end to the telephoto end is schematically indicated by an arrow. It should be noted that, under the lens group remaining stationary with respect to an image plane Sim during zooming, a linear arrow is drawn.

In FIG. 2, the wide-angle end state is shown in the top part labeled "wide-angle end", the first middle focal length state is shown in the second part which is second from the top and is labeled the "first middle", the second middle focal length state is shown in the third part which is third from the top and is labeled the "second middle", and the telephoto end state is shown in the bottom part labeled the "telephoto end". The focal length of the whole system increases in order of the wide-angle end state, the first middle focal length state, the second middle focal length state, and the telephoto end state. The definition of the first middle focal length state and the second middle focal length state will be described later in detail. The rays in FIG. 2 indicate on-axis rays and rays with the maximum angle of view in the respective states.

In order to apply the zoom lens to an imaging apparatus, it is preferable to provide various filters, a prism, and/or a protective cover glass based on specification of the imaging apparatus. Thus, FIG. 1 shows an example where an optical member PP, in which those are considered and the incident surface and the exit surface are parallel, is disposed between the lens system and the image plane Sim. Although the optical member PP in FIG. 1 consists of three members, the number of members constituting the optical member PP is not limited to that in FIG. 1, and in the present invention, the optical member PP may be omitted.

The zoom lens consists of, in order from the object side to the image side along the optical axis Z: a first lens group G1 that has a positive refractive power and remains stationary with respect to the image plane Sim during zooming; a second lens group G2 that has a negative refractive power and moves in the direction of the optical axis, and a subsequent lens group GR. The first lens group G1 has at least one positive lens, and a negative lens L1 is disposed to be closest to the object side of the first lens group G1. The subsequent lens group GR is configured to have, successively in order from the image side to the object side, a final lens group Ge that has a positive refractive power and remains stationary with respect to the image plane Sim during zooming, a positive lens group Gp that moves in the direction of the optical axis during zooming, an aperture stop St, and a negative lens group Gn that moves in the direction of the optical axis during zooming. During zooming, a distance between the second lens group G2 and the subsequent lens group GR in the direction of the optical axis changes, and a distance between the positive lens group Gp and the negative lens group Gn in the direction of the optical axis changes.

By adopting the above-mentioned configuration, it is possible to shorten the total length of the lens system while ensuring a high zoom ratio. Separately from the second lens group G2 having a main zooming function, the image plane Sim can be corrected for zooming by moving the negative lens group Gn during zooming, and further fluctuation in spherical aberration and fluctuation in field curvature during zooming can be corrected by moving the positive lens group Gp. By adopting a configuration in which the first lens group G1 occupying the most of the weight of the whole lens system remains stationary during zooming, it is possible to reduce fluctuation in center of gravity of the lens system during zooming, and it is possible to improve convenience at the time of imaging. Further, the final lens group Ge, which has the positive refractive power and remains stationary during zooming, is disposed to be closest to the image side. Thereby, it becomes easy for an extender, which is capable of extending the focal length of the whole system, to be detachably disposed in the vicinity of the final lens group Ge.

The negative lens L1 is disposed to be closest to the object side in the first lens group G1. Thereby, it is possible to minimize an incident angle of the off-axis rays incident into the lens closer to the image side than the negative lens L1. As a result, there is an advantage in achieving wide angle. In addition, it is preferable that the first lens group G1 has three or more positive lenses. In such a case, it is possible to suppress remarkable occurrence of spherical aberration and astigmatism.

The zoom lens of the example shown in FIG. 1 has a five-group configuration consisting of, in order from the object side to the image side along the optical axis Z, the first lens group G1, the second lens group G2, the negative lens group Gn, the aperture stop St, the positive lens group Gp, and the final lens group Ge. The subsequent lens group GR is composed of the negative lens group Gn, the aperture stop St, the positive lens group Gp, and the final lens group Ge. It should be noted that the aperture stop St shown in FIG. 1 does not necessarily indicate its sizes and/or shapes, and indicates a position of the aperture stop St on the optical axis Z.

In the zoom lens, the aperture stop St is disposed between the negative lens group Gn and the positive lens group Gp. Thereby, it is possible to minimize heights of the off-axis rays in the radial direction in the first lens group G1 and the final lens group Ge. As a result, there is an advantage in reducing the size thereof.

Further, in the zoom lens, the aperture stop St is configured to move integrally with the positive lens group Gp during zooming. In FIG. 1, the movement loci of the aperture stop St and the positive lens group Gp are indicated by the same arrows. In a case of zooming from the wide-angle end to the telephoto end, the aperture stop St is configured to first move to the object side along the optical axis Z and thereafter to reversely move to the image side. The state where the aperture stop St reversely moves from the object side to the image side is referred to as a first middle focal length state. In FIG. 1, a point corresponding to the first middle focal length state on the movement locus is shown as m1.

As can be seen from FIG. 2, the height of the off-axis principal ray in the lens closest to the object side in the first lens group G1 is high in the wide-angle end state and the first middle focal length state, is low in the second middle focal length state, and is lower in the telephoto end state. Therefore, by moving the aperture stop St to the object side during change from the wide-angle end to the first middle focal length state as described above, the aperture stop St is moved to be close to the first lens group G1 in the zoom range where the height of the off-axis principal ray is high. Thereby, it is possible to minimize the lens diameter of the first lens group G1. As a result, there is an advantage in reduction in weight. In a case where the aperture stop St is too close to the object side, it becomes difficult to correct aberrations. Therefore, by reversely moving the aperture stop St in the first middle focal length state, it is possible to balance both of reduction in weight and favorable aberration correction.

Further, during zooming from the first middle focal length state to the telephoto end, it is preferable that the aperture stop St is configured to first move to the image side and thereafter reversely move to the object side along the optical axis Z. In such a case, it is possible to suppress occurrence of spherical aberration on the telephoto side. In the example shown in FIG. 1, the aperture stop St moves as described above. The state where the aperture stop St reversely moves from the image side to the object side is referred to as a second middle focal length state. In FIG. 1, a point corresponding to the second middle focal length state on the movement locus is shown as m2.

That is, in the example shown in FIG. 1, the aperture stop St moves to the object side during change from the wide-angle end to the first middle focal length state, moves to the image side during change from the first middle focal length state to the second middle focal length state, and moves to the object side during change from the second middle focal length state to the telephoto end.

Particularly, in the first lens group G1, the zoom state where the height of the off-axis principal ray passing through the lens disposed on the image side tends to be longer is a state closer to the wide-angle end. Therefore, in order to minimize the ray height in this zoom state, it is effective to set the first middle focal length state to the wide-angle side. From these facts, assuming that a focal length of the whole system at the first middle focal length state is fm1, a focal length of the whole system at the wide-angle end is fw, and a focal length of the whole system at the telephoto end is ft, it is preferable that the following relationship is satisfied.

$$fw < fm1 < (fw \times ft)^{1/2}$$

By keeping the aperture stop St on the image side, it becomes easy to suppress fluctuation in F number during zooming, but it becomes difficult to correct spherical aberration. Therefore, in order to suppress occurrence of spherical aberration while reducing fluctuation in F number as much as possible during zooming, it is effective to set the second middle focal length state to the telephoto side. From these facts, assuming that a focal length of the whole system in the second middle focal length state is fm2, a focal length of the whole system at the wide-angle end is fw, and a focal length of the whole system at the telephoto end is ft, it is preferable that the following relationship is satisfied.

$$(fw \times ft)^{1/2} < fm2 < ft$$

Assuming that a distance on the optical axis from a lens surface closest to the object side in the first lens group G1 to a lens surface closest to the image side in the first lens group G1 is DG1 and an amount of movement of the aperture stop St in the direction of the optical axis from the wide-angle end to the first middle focal length state is Dwm1, the zoom lens is configured to satisfy Conditional Expression (1). By not allowing the result of Conditional Expression (1) to be equal to or less than the lower limit, it is possible to ensure a lens configuration in the first lens group G1. As a result, it is possible to suppress occurrence of spherical aberration and astigmatism. By not allowing the result of Conditional Expression (1) to be equal to or greater than the upper limit, it is possible to decrease a thickness of the first lens group G1 in the direction of the optical axis. Further, by not allowing the result of Conditional Expression (1) to be equal to or greater than the upper limit, the aperture stop St can be moved to be close to the first lens group G1. Therefore, it is possible to minimize the lens diameter of the first lens group G1. From these facts, there is an advantage in reducing the weight of the first lens group G1. In order to enhance the effect relating to Conditional Expression (1), it is more preferable that Conditional Expression (1-1) is satisfied.

$$3 < DG1/Dwm1 < 6 \tag{1}$$

$$3.5 < DG1/Dwm1 < 5.5 \tag{1-1}$$

Assuming that a focal length of the first lens group G1 is f1 and a focal length of the negative lens L1 closest to the object side in the first lens group G1 is fL1, it is preferable that the zoom lens satisfies Conditional Expression (2). By not allowing the result of Conditional Expression (2) to be equal to or less than the lower limit, it is possible to suppress occurrence of spherical aberration. By not allowing the result of Conditional Expression (2) to be equal to or greater than the upper limit, it is possible to increase an absolute value of the radius of curvature of each lens in the first lens group G1. As a result, it is possible to suppress an increase in size of the lens, and it is possible to achieve reduction in weight. In order to enhance the effect relating to Conditional Expression (2), it is more preferable that Conditional Expression (2-1) is satisfied.

$$-0.8 < f1/fL1 < -0.6 \tag{2}$$

$$-0.78 < f1/fL1 < -0.62 \tag{2-1}$$

Assuming that a refractive index of the negative lens L1 closest to the object side in the first lens group G1 at a d line is NL1 and an average of refractive indices of all positive lenses in the first lens group G1 at the d line is Navelp, it is preferable that Conditional Expression (3) is satisfied. By not allowing the result of Conditional Expression (3) to be equal to or less than the lower limit, it is possible to increase an absolute value of the radius of curvature of the negative lens L1 closest to the object side in the first lens group G1. As a result, it is possible to suppress an increase in size of the lens, and it is possible to achieve reduction in weight. By not allowing the result of Conditional Expression (3) to be equal to or greater than the upper limit, it is possible to suppress occurrence of spherical aberration. In order to enhance the effect relating to Conditional Expression (3), it is more preferable that Conditional Expression (3-1) is satisfied.

$$0.11 < NL1 - Navelp < 0.26 \quad (3)$$

$$0.15 < NL1 - Navelp < 0.24 \quad (3\text{-}1)$$

Assuming that a sum of a distance on the optical axis from a lens surface closest to the object side to a lens surface closest to the image side and an air-converted distance on the optical axis from the lens surface closest to the image side to the image plane Sim is TL and a focal length of the whole system at the telephoto end is ft, it is preferable that Conditional Expression (4) is satisfied. By not allowing the result of Conditional Expression (4) to be equal to or less than the lower limit, there is an advantage in ensuring a small F number at the telephoto end. By not allowing the result of Conditional Expression (4) to be equal to or greater than the upper limit, there is an advantage in reducing the size thereof. In order to enhance the effect relating to Conditional Expression (4), it is more preferable that Conditional Expression (4-1) is satisfied.

$$1 < TL/ft < 1.6 \quad (4)$$

$$1.2 < TL/ft < 1.56 \quad (4\text{-}1)$$

Assuming that a composite focal length of the negative lens group Gn, the positive lens group Gp, and the final lens group Ge at the wide-angle end is frw, and a focal length of the whole system at the wide-angle end is fw, it is preferable that the zoom lens satisfies Conditional Expression (5). By not allowing the result of Conditional Expression (5) to be equal to or less than the lower limit, a composite refractive power of a part, which is disposed on the image side in the lens system, is prevented from becoming excessively strong. As a result, it is possible to suppress occurrence of spherical aberration and astigmatism. By not allowing the result of Conditional Expression (5) to be equal to or greater than the upper limit, a composite refractive power of a part, which is disposed on the image side in the lens system, is ensured, and thereby a back focal length is prevented from increasing beyond necessity. As a result, it is possible to minimize the total length of the lens system. In order to enhance the effect relating to Conditional Expression (5), it is more preferable that Conditional Expression (5-1) is satisfied.

$$4.5 < frw/fw < 6 \quad (5)$$

$$5 < frw/fw < 5.5 \quad (5\text{-}1)$$

It is preferable that the negative lens group Gn is configured to consist of a negative lens and a positive lens in order from the object side. Since the negative lens group Gn tends to be disposed in the middle of the divergent light, in a case where the lenses are arranged in this order, it is possible to suppress occurrence of spherical aberration and astigmatism. At that time, in a case where the negative lens group Gn is configured to consist of a biconcave lens and a positive lens convex toward the object side in order from the object side, it is possible to more satisfactorily suppress occurrence of spherical aberration and astigmatism. Further, by adopting a configuration in which the negative lens group Gn moving during zooming consists of two lenses including a negative lens and a positive lens, there is an advantage in achieving both favorable aberration correction and reduction in weight.

As described above, in the case where the negative lens group Gn consists of a negative lens and a positive lens in order from the object side, assuming that an Abbe number of the negative lens of the negative lens group Gn at the d line is vn and an Abbe number of the positive lens of the negative lens group Gn at the d line is vp, it is preferable that Conditional Expression (6) is satisfied. By not allowing the result of Conditional Expression (6) to be equal to or less than the lower limit, there is an advantage in correcting longitudinal chromatic aberration on the wide-angle side. By not allowing the result of Conditional Expression (6) to be equal to or greater than the upper limit, there is an advantage in correcting longitudinal chromatic aberration on the telephoto side. In order to enhance the effect relating to Conditional Expression (6), it is more preferable that Conditional Expression (6-1) is satisfied.

$$10 < vn - vp < 25 \quad (6)$$

$$15 < vn - vp < 20 \quad (6\text{-}1)$$

Considering the correction of chromatic aberration in the first lens group G1, assuming that an average of Abbe numbers of all positive lenses of the first lens group G1 at the d line is vavelp, it is preferable that Conditional Expression (7) is satisfied. By satisfying Conditional Expression (7), it is suitable for suppressing lateral chromatic aberration in a well-balanced manner while suppressing longitudinal chromatic aberration on the blue side. In order to enhance the effect relating to Conditional Expression (7), it is more preferable that Conditional Expression (7-1) is satisfied.

$$67 < vavelp < 90 \quad (7)$$

$$70 < vavelp < 86 \quad (7\text{-}1)$$

It is preferable that the zoom lens is configured to perform focusing by moving a part of lenses in the first lens group G1 as focusing lenses in the direction of the optical axis. In this case, it is possible to reduce the difference caused by the zoom state of the amount of movement of the focusing lens, and it is possible to obtain a zoom lens with high convenience at the time of imaging. Further, in a case where only a part of lenses in the first lens group G1 are used as focusing lenses, as compared with a case where all the lenses in the first lens group G1 are used as focusing lenses, it is possible to reduce the load on the driving system. In a case where the focusing lens is configured to consist of a plurality of lenses, focusing may be performed by integrally moving all the lenses constituting the focusing lenses, or the focusing lens may be divided into a plurality of sub-lens groups, and the focusing may be performed by moving the plurality of sub-lens groups with mutually different loci.

In the present invention, the number of lens groups of the subsequent lens group GR may be different from that of the example of FIG. 1, and the number of lenses constituting each lens group may be different from that of the example shown in FIG. 1. The zoom lens of the present invention can be configured to consist of, for example, an aperture stop St and five or six lens groups that are configured such that distances between lens groups adjacent to each other change during zooming. In this case, by ensuring a high zoom ratio while shortening the total length of the lens system, it becomes easy to satisfactorily correct various aberrations throughout the entire zoom range.

It should be noted that the above-mentioned preferred configurations and available configurations may be arbitrary combinations, and it is preferable to selectively adopt the configurations in accordance with required specification. According to the present embodiment, it is possible to realize a zoom lens which has a high optical performance by achieving reduction in size and weight and satisfactorily correcting various aberrations while ensuring a high zoom ratio. It should be noted that the "high zoom ratio" described herein means a zoom ratio of 15 times or more.

Next, numerical examples of the zoom lens of the present invention will be described.

EXAMPLE 1

A configuration of a zoom lens of Example 1 is shown in FIGS. 1 and 2, and an illustration method thereof is as described above. Therefore, repeated description is partially omitted herein. The zoom lens according to Example 1 has a five-group configuration, and consists of, in order from the object side, a first lens group G1 having a positive refractive power, a second lens group G2 having a negative refractive power, a negative lens group Gn, an aperture stop St, a positive lens group Gp, and a final lens group Ge having a positive refractive power. During zooming, the first lens group G1 and the final lens group Ge remain stationary with respect to the image plane Sim, the other lens groups move such that distances between lens groups adjacent to each other in the direction of the optical axis change, and the stop St moves integrally with the positive lens group Gp. Three lenses consisting of the first to third lenses from the image side of the first lens group G1 are focusing lenses. The first sub-lens group consisting of the second to third lenses from the image side of the first lens group G1 and the second sub-lens group consisting of the lens closest to the image side of the first lens group G1 move with mutually different loci during focusing.

Table 1 shows basic lens data of the zoom lens of Example 1, Table 2 shows variable surface distances, and Table 3 shows aspheric coefficients thereof. In Table 1, the column of Si shows i-th (i=1, 2, 3, . . . ) surface number. The i-th surface number is attached to each of surfaces of the elements, where i sequentially increases toward the image side in a case where an object side surface of an element closest to the object side is regarded as a first surface. The column of Ri shows a radius of curvature of the i-th surface. The column of Di shows a distance on the optical axis Z between the i-th surface and an (i+1)th surface. In Table 1, the column of Ndj shows a refractive index of a j-th (j=1, 2, 3, . . . ) element at the d line (a wavelength of 587.6 nm (nanometers)), where j sequentially increases toward the image side when the surface of the element closest to the object side is regarded as the first surface. The column of vdj shows an Abbe number of the j-th element on the basis of the d line. The column of θgFj shows a partial dispersion ratio of the j-th element between the g line (a wavelength of 435.8 nm (nanometers)) and the F line (a wavelength of 486.1 nm (nanometers)). It should be noted that the partial dispersion ratio θgF between the g line and the F line of a certain lens is defined by θgF=(Ng−NF)/(NF−NC), where the refractive indexes of the lens at the g line, the F line, and the C line (a wavelength of 656.3 nm (nanometers)) are Ng, NF, and NC, respectively.

Here, reference signs of radii of curvature of surface shapes convex toward the object side are set to be positive, and reference signs of radii of curvature of surface shapes convex toward the image side are set to be negative. Table 1 additionally shows the aperture stop St and the optical member PP. In Table 1, in a place of a surface number of a surface corresponding to the aperture stop St, a term of (St) is also noted. A value at the bottom place of Di indicates a distance between the image plane Sim and the surface closest to the image side in the table. In Table 1, the variable surface distances are referenced by the reference signs DD[ ], and are written into places of Di, where object side surface numbers of distances are noted in [ ].

In the range of Table 2, values of the zoom ratio Zr, the focal length f of the whole system, the F number FNo., the maximum total angle of view 2ω, and the variable surface distance are based on the d line.)(°) in the place of 2ω indicates that the unit thereof is a degree. In Table 2, values in the wide-angle end state, the first middle focal length state, the second middle focal length state, and the telephoto end state are respectively shown in the columns labeled wide-angle end, first middle, second middle, and telephoto end. The values of Tables 1 and 2 are values in a state where the object at the infinity is in focus.

In Table 1, the reference sign * is attached to surface numbers of aspheric surfaces, and numerical values of the paraxial radius of curvature are written into the column of the radius of curvature of the aspheric surface. Table 3 shows aspheric coefficients of the aspheric surfaces of Example 1. The "E±n" (n: an integer) in numerical values of the aspheric coefficients of Table 3 indicates "×10±n". The aspheric coefficients are values of the coefficients KA and Am (m=4, 6, 8, . . . ) in aspheric surface expression represented as the following expression.

$$Zd = \frac{C \times h^2}{1 + \sqrt{1 - KA \times C^2 \times h^2}} + \sum_m Am \times h^m \qquad \text{Numerical Expression 1}$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, and KA and Am are aspheric coefficients.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

| | Example 1 | | | | |
|---|---|---|---|---|---|
| Si | Ri | Di | Ndj | vdj | θgFj |
| 1 | −164.43083 | 2.000 | 1.73800 | 32.26 | 0.58995 |
| 2 | 150.60830 | 0.589 | 1.69591 | 17.68 | 0.68555 |
| 3 | 161.38658 | 12.669 | 1.48749 | 70.24 | 0.53007 |
| 4 | −132.91942 | 9.469 | | | |
| 5 | 139.19047 | 9.005 | 1.43387 | 95.18 | 0.53733 |
| 6 | −304.63496 | 0.120 | | | |
| *7 | 111.19461 | 5.345 | 1.53775 | 74.70 | 0.53936 |
| 8 | 413.36081 | 0.201 | | | |
| *9 | 73.58374 | 5.369 | 1.72916 | 54.68 | 0.54451 |
| 10 | 167.96041 | DD[10] | | | |
| *11 | 98.83522 | 0.800 | 2.00100 | 29.13 | 0.59952 |
| 12 | 15.29894 | 5.198 | | | |
| 13 | −46.18580 | 0.800 | 1.98881 | 23.90 | 0.62060 |
| 14 | 107.70611 | 1.210 | | | |
| 15 | −597.72735 | 6.177 | 1.95906 | 17.47 | 0.65993 |
| 16 | −14.10574 | 0.800 | 1.96948 | 29.85 | 0.59845 |
| 17 | −5446.60437 | 0.120 | | | |
| 18 | 44.49277 | 2.671 | 1.66697 | 58.15 | 0.54256 |
| 19 | −112.17999 | DD[19] | | | |
| 20 | −30.60741 | 0.810 | 1.83287 | 39.10 | 0.57402 |
| 21 | 51.11762 | 2.375 | 1.89286 | 20.36 | 0.63944 |
| 22 | −236.93035 | DD[22] | | | |

TABLE 1-continued

Example 1

| Si | Ri | Di | Ndj | vdj | θgFj |
|---|---|---|---|---|---|
| 23(St) | ∞ | 0.500 | | | |
| *24 | 335.57267 | 3.373 | 1.85400 | 40.38 | 0.56890 |
| *25 | −44.83003 | 0.120 | | | |
| 26 | 95.55559 | 5.329 | 1.64701 | 56.57 | 0.54718 |
| 27 | −32.37535 | 0.800 | 1.95375 | 32.32 | 0.59015 |
| 28 | −212.61895 | DD[28] | | | |
| 29 | 321.73111 | 3.074 | 1.84661 | 23.88 | 0.62072 |
| 30 | −60.72541 | 0.156 | | | |
| 31 | 52.66064 | 5.552 | 1.53775 | 74.70 | 0.53936 |
| 32 | −40.25250 | 0.800 | 1.95375 | 32.32 | 0.59015 |
| 33 | 34.66846 | 1.161 | | | |
| 34 | 46.40769 | 5.846 | 1.48749 | 70.24 | 0.53007 |
| 35 | −33.65154 | 0.800 | 1.95375 | 32.32 | 0.59015 |
| 36 | −75.66376 | 3.357 | | | |
| 37 | 51.41774 | 5.602 | 1.52598 | 61.95 | 0.54187 |
| 38 | −45.63783 | 0.200 | | | |
| 39 | ∞ | 1.000 | 1.51633 | 64,14 | 0.53531 |
| 40 | ∞ | 5.778 | | | |
| 41 | ∞ | 33.000 | 1.60859 | 46.44 | 0.56664 |
| 42 | ∞ | 13.200 | 1.51633 | 64.05 | 0.53463 |
| 43 | ∞ | 5.302 | | | |

TABLE 2

Example 1

| | Wide-Angle End | First Middle | Second Middle | Telephoto End |
|---|---|---|---|---|
| Zr | 1.0 | 3.1 | 9.5 | 22.2 |
| f | 7.875 | 24.334 | 75.051 | 174.829 |
| FNo. | 1.85 | 1.86 | 1.85 | 2.76 |
| 2ω(°) | 77.2 | 25.0 | 8.4 | 3.6 |
| DD[10] | 0.792 | 33.114 | 54.519 | 61.327 |
| DD[19] | 61.690 | 10.939 | 2.009 | 5.551 |
| DD[22] | 8.440 | 15.198 | 12.289 | 1.543 |
| DD[28] | 36.052 | 47.722 | 38.156 | 38.552 |

TABLE 3

Example 1

| Surface Number | 7 | 9 | 11 |
|---|---|---|---|
| KA | 1.0000000E+00 | 1.0000000E+00 | 1.0000000E+00 |
| A4 | 5.4611409E−11 | −2.3018041E−08 | 2.2222756E−06 |
| A6 | 1.7733012E−11 | −2.6852914E−11 | −1.0520667E−08 |
| A8 | −7.8866427E−15 | 1.1031239E−14 | 9.6362829E−11 |
| A10 | 1.0321390E−18 | −2.8823063E−18 | −4.0738207E−13 |

| Surface Number | 24 | 25 |
|---|---|---|
| KA | 1.0000000E+00 | 1.0000000E+00 |
| A4 | 8.6874530E−07 | 1.2267766E−06 |
| A6 | −1.7478248E−08 | −1.4938079E−08 |
| A8 | 6.0278864E−11 | 4.0691981E−11 |
| A10 | −6.3436153E−14 | −2.9359664E−14 |

Figure 9:
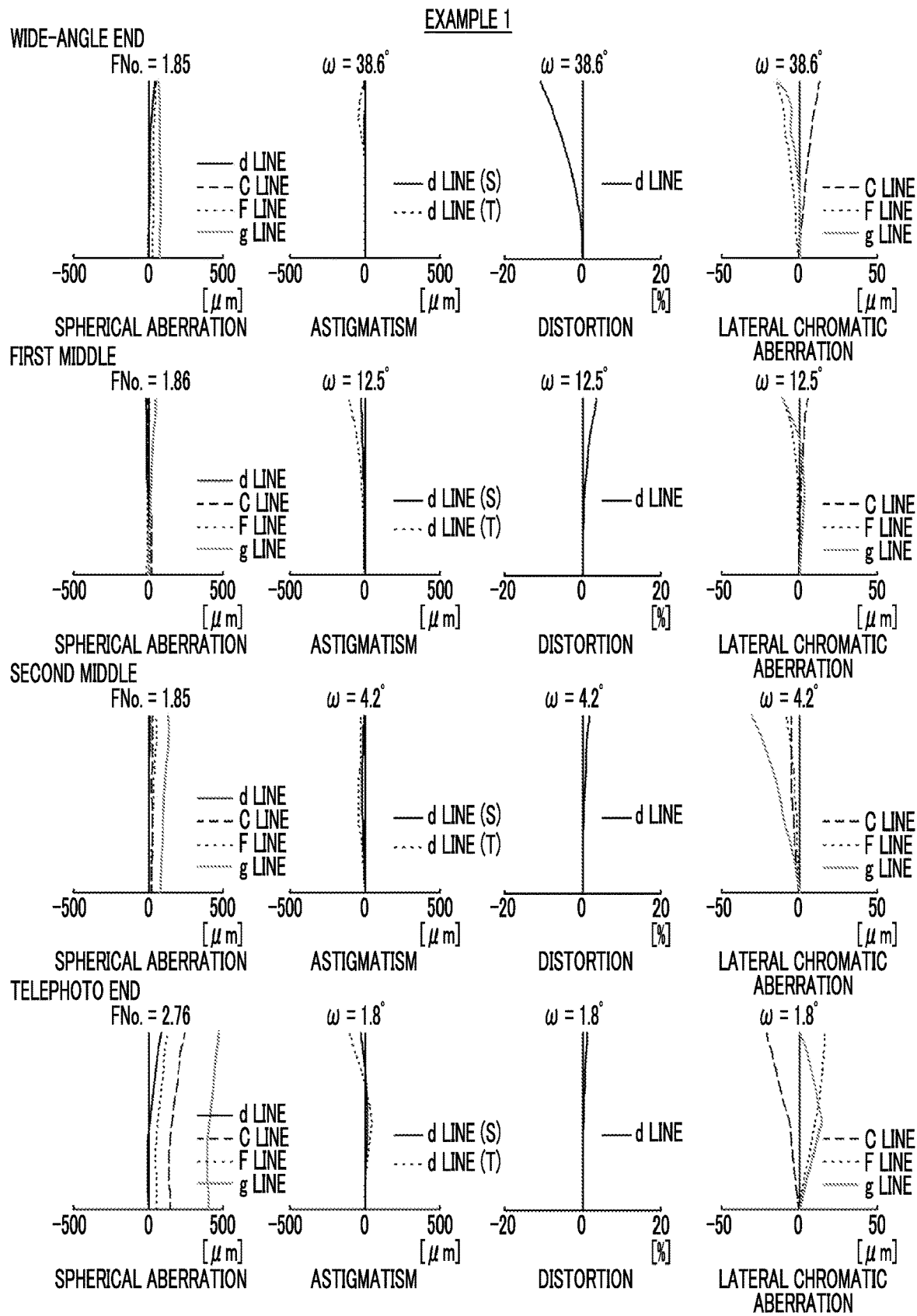
FIG. 9 is a diagram of aberrations of the zoom lens of Example 1 of the present invention.

FIG. 9 shows aberration diagrams in a state where an object at the infinity is brought into focus through the zoom lens of Example 1. In FIG. 9, in order from the left side, spherical aberration, astigmatism, distortion, and lateral chromatic aberration are shown. In FIG. 9, the wide-angle end state is shown in the top part labeled wide-angle end, the first middle focal length state is shown in the second part which is second from the top and is labeled the first middle, the second middle focal length state is shown in the third part which is third from the top and is labeled the second middle, and the telephoto end state is shown in the bottom part labeled the telephoto end. In the spherical aberration diagram, aberrations at the d line (a wavelength of 587.6 nm (nanometers)), the C line (a wavelength of 656.3 nm (nanometers)), the F line (a wavelength of 486.1 nm (nanometers)), and the g line (a wavelength of 435.8 nm (nanometers)) are respectively indicated by the solid line, the long dashed line, the short dashed line, and the gray solid line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the short dashed line, and the gray solid line. In the spherical aberration diagram, FNo. indicates an F number. In the other aberration diagrams, ω indicates a half angle of view.

In the description of Example 1, reference signs, meanings, and description methods of the respective data pieces are the same as those in the following examples unless otherwise noted. Therefore, in the following description, repeated description will be omitted.

EXAMPLE 2

Figure 3:
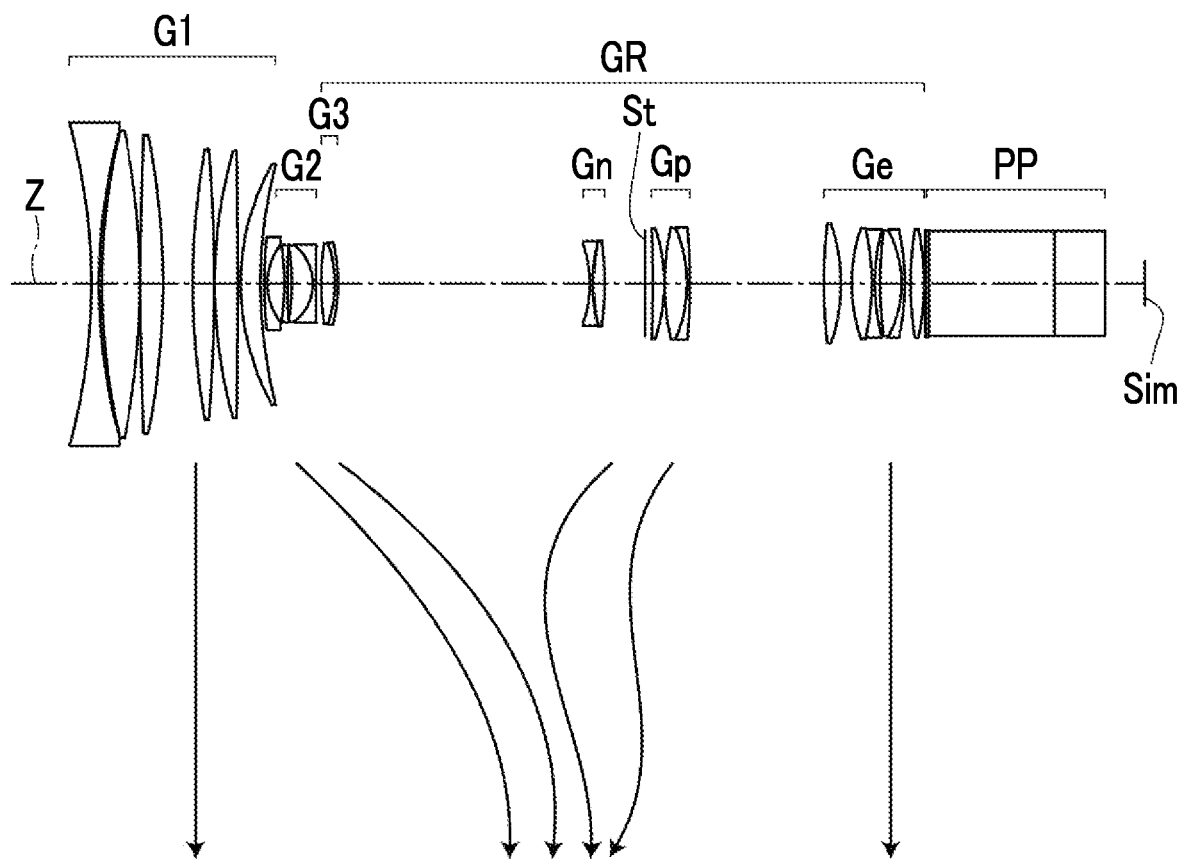
FIG. 3 is a cross-sectional view illustrating a lens configuration and a movement locus of a zoom lens of Example 2 of the present invention at the wide-angle end.
Figure 4:
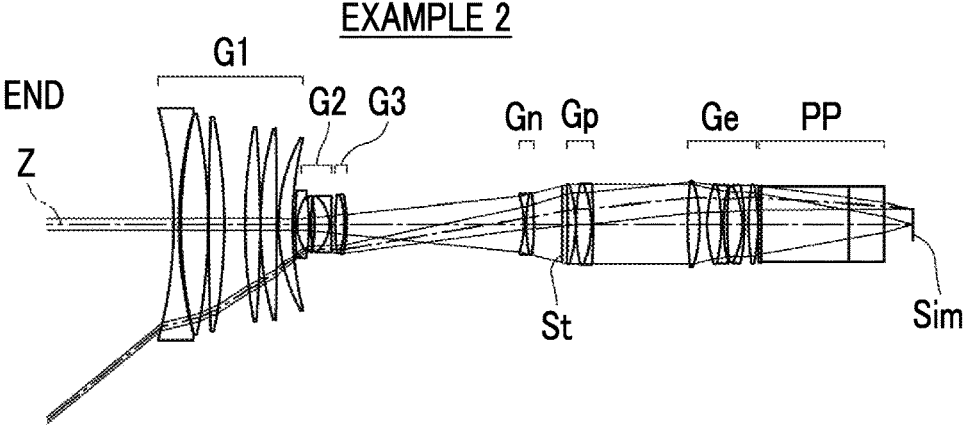
FIG. 4 is a cross-sectional view illustrating a configuration and optical paths of the zoom lens of Example 2 of the present invention at the wide-angle end, the first middle focal length state, the second middle focal length state, and the telephoto end.
Figure 4:
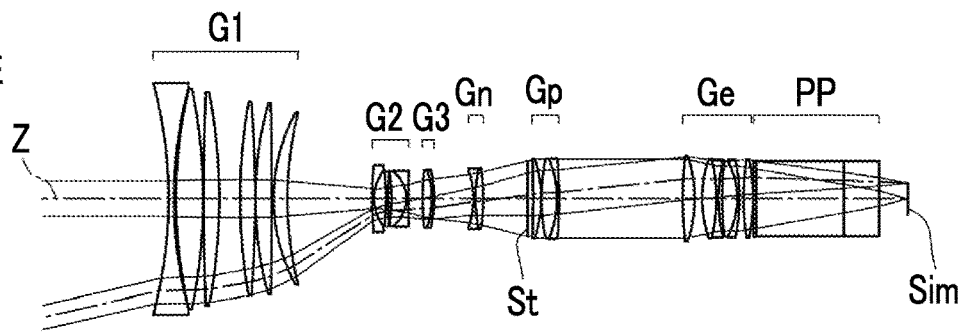
Figure 4:
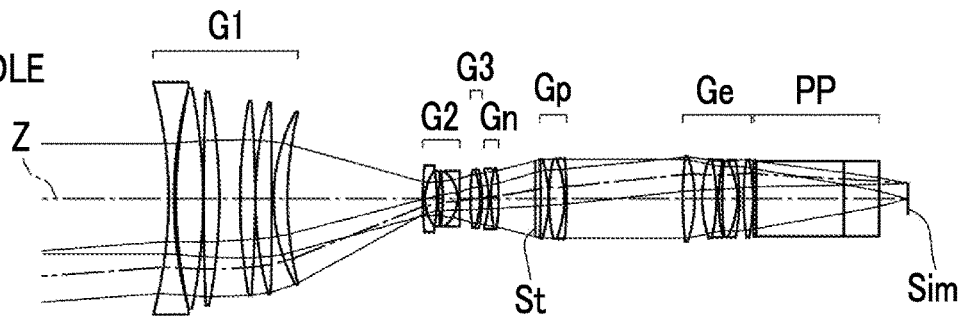
Figure 4:
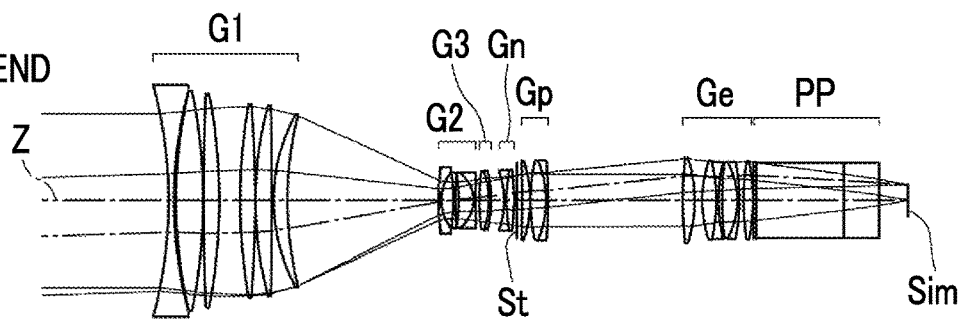

FIGS. 3 and 4 are cross-sectional views illustrating a lens configuration of the zoom lens of Example 2. The zoom lens of Example 2 has a six-group configuration, and consists of, in order from the object side, a first lens group G1 having a positive refractive power, a second lens group G2 having a negative refractive power, a third lens group G3 having a positive refractive power, a negative lens group Gn, an aperture stop St, a positive lens group Gp, and a final lens group Ge having a positive refractive power. During zooming, the first lens group G1 and the final lens group Ge remain stationary with respect to the image plane Sim, the other lens groups move such that distances between lens groups adjacent to each other in the direction of the optical axis change, and the aperture stop St moves integrally with the positive lens group Gp. Three lenses consisting of the first to third lenses from the image side of the first lens group G1 are focusing lenses. The first sub-lens group consisting of the second to third lenses from the image side of the first lens group G1 and the second sub-lens group consisting of the lens closest to the image side of the first lens group G1 move with mutually different loci during focusing. The above is a schematic configuration of the zoom lens of Example 2.

Figure 10:
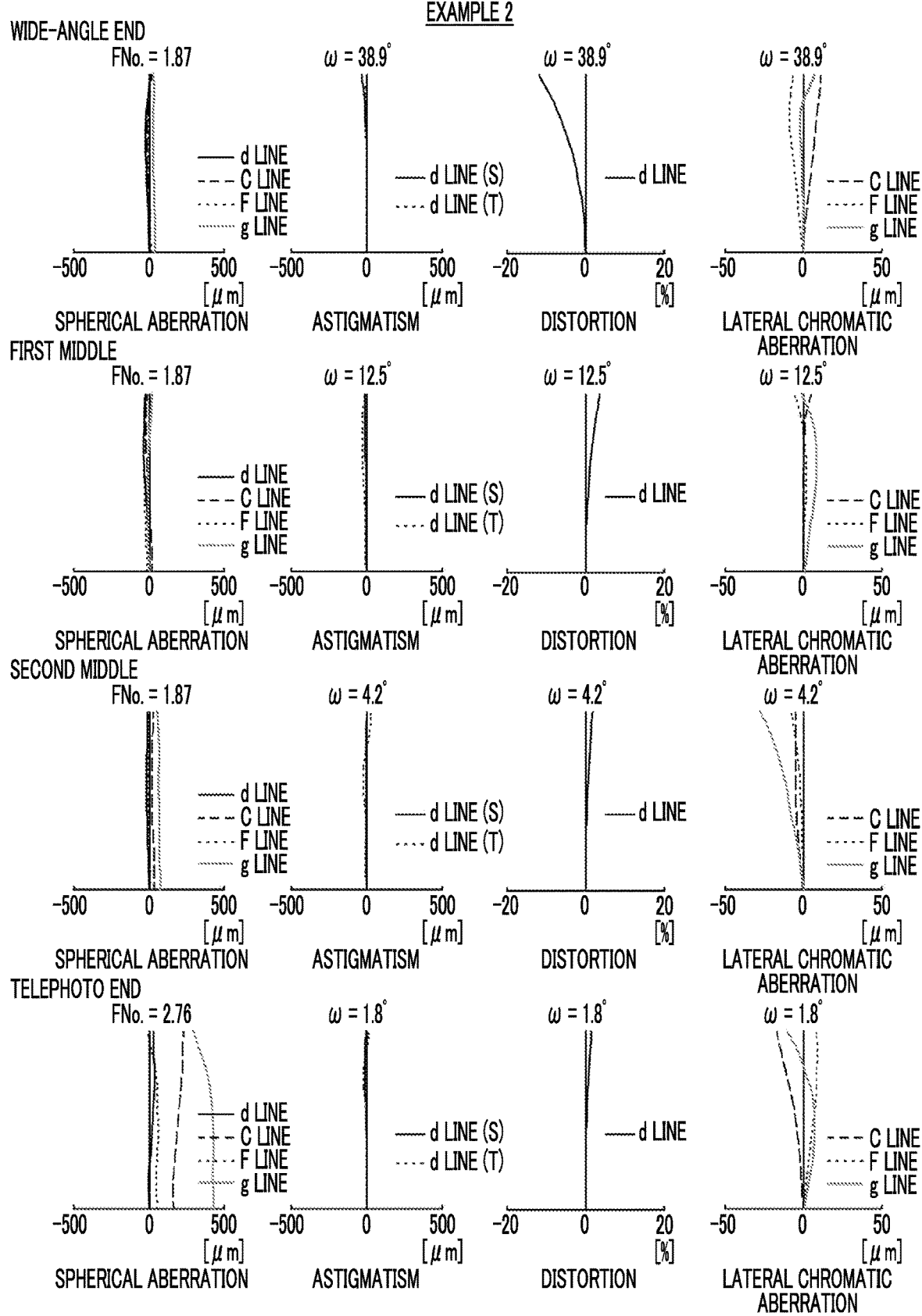
FIG. 10 is a diagram of aberrations of the zoom lens of Example 2 of the present invention.

Table 4 shows basic lens data of the zoom lens of Example 2, Table 5 shows specification and variable surface distances, Table 6 shows aspheric coefficients, and FIG. 10 shows aberration diagrams in a state where the object at infinity is in focus.

TABLE 4

Example 2

| Si | Ri | Di | Ndj | vdj | θgFj |
|---|---|---|---|---|---|
| 1 | −158.02765 | 2.000 | 1.73800 | 32.26 | 0.58995 |
| 2 | 152.49383 | 0.779 | 1.62342 | 22.44 | 0.68049 |
| 3 | 173.67264 | 10.108 | 1.48749 | 70.24 | 0.53007 |
| 4 | −197.56453 | 0.120 | | | |
| *5 | 686.72741 | 5.947 | 1.43387 | 95.18 | 0.53733 |
| 6 | −198.96329 | 7.769 | | | |
| 7 | 196.99496 | 5.623 | 1.43387 | 95.18 | 0.53733 |

TABLE 4-continued

Example 2

| Si | Ri | Di | Ndj | vdj | θgFj |
|---|---|---|---|---|---|
| 8 | −442.59846 | 0.120 | | | |
| 9 | 129.51983 | 5.995 | 1.53775 | 74.70 | 0.53936 |
| *10 | −3600.71841 | 0.800 | | | |
| 11 | 64.63154 | 5.136 | 1.72916 | 54.68 | 0.54451 |
| 12 | 124.44778 | DD[12] | | | |
| *13 | 127.53411 | 0.800 | 2.00100 | 29.13 | 0.59952 |
| 14 | 16.66175 | 4.415 | | | |
| 15 | −70.33787 | 0.800 | 1.95375 | 32.32 | 0.59015 |
| 16 | 150.14448 | 1.243 | | | |
| 17 | −61.07077 | 5.534 | 1.89286 | 20.36 | 0.63944 |
| 18 | −12.64992 | 0.800 | 1.95375 | 32.32 | 0.59015 |
| 19 | 734.99166 | DD[19] | | | |
| 20 | 83.41270 | 3.525 | 1.73337 | 33.43 | 0.59117 |
| 21 | −31.25494 | 0.800 | 1.91802 | 36.20 | 0.57818 |
| 22 | −47.07679 | DD[22] | | | |
| 23 | −30.69130 | 0.810 | 1.82261 | 36.42 | 0.58195 |
| 24 | 52.19481 | 2.887 | 1.89286 | 20.36 | 0.63944 |
| 25 | −80.18523 | DD[25] | | | |
| 26(St) | ∞ | 2.000 | | | |
| 27 | −391.53916 | 3.003 | 1.79143 | 40.03 | 0.57373 |
| 28 | −44.70738 | 0.120 | | | |
| 29 | 67.26786 | 5.782 | 1.49933 | 80.10 | 0.51543 |
| 30 | −37.10870 | 0.800 | 1.95375 | 32.32 | 0.59015 |
| 31 | −160.23482 | DD[31] | | | |
| 32 | 146.80358 | 4.400 | 1.50583 | 58.93 | 0.54519 |
| 33 | −48.67604 | 2.841 | | | |
| 34 | 44.64265 | 5.245 | 1.48749 | 70.24 | 0.53007 |
| 35 | −61.60518 | 0.800 | 1.95375 | 32.32 | 0.59015 |
| 36 | 55.74040 | 1.399 | | | |
| 37 | 111.69774 | 5.670 | 1.48749 | 70.24 | 0.53007 |
| 38 | −28.37539 | 0.800 | 1.95375 | 32.32 | 0.59015 |
| 39 | −66.69450 | 1.507 | | | |
| 40 | 87.03786 | 3.546 | 1.68391 | 31.15 | 0.59542 |
| 41 | −71.42318 | 0.300 | | | |
| 42 | ∞ | 1.000 | 1.51633 | 64.14 | 0.53531 |
| 43 | ∞ | 33.000 | 1.60859 | 46.44 | 0.56664 |
| 44 | ∞ | 13.200 | 1.51633 | 64.05 | 0.53463 |
| 45 | ∞ | 10.436 | | | |

TABLE 5

Example 2

| | Wide-Angle End | First Middle | Second Middle | Telephoto End |
|---|---|---|---|---|
| Zr | 1.0 | 3.1 | 9.5 | 22.2 |
| f | 7.877 | 24.339 | 75.066 | 174.865 |
| FNo. | 1.87 | 1.87 | 1.87 | 2.76 |
| 2ω(°) | 77.8 | 25.0 | 8.4 | 3.6 |
| DD[12] | 1.000 | 31.387 | 50.352 | 56.293 |
| DD[19] | 1.397 | 5.248 | 3.998 | 1.397 |
| DD[22] | 65.789 | 14.454 | 2.513 | 4.919 |
| DD[25] | 10.567 | 16.657 | 13.683 | 1.048 |
| DD[31] | 34.999 | 46.004 | 43.206 | 50.095 |

TABLE 6

Example 2

| Surface Number | 5 | 10 | 13 |
|---|---|---|---|
| KA | 9.8642991E−01 | 1.0000000E+00 | 1.0000000E+00 |
| A4 | −9.3766584E−08 | −9.7672447E−08 | 2.4634002E−06 |
| A6 | −2.0627742E−10 | −1.1537020E−10 | 2.6576085E−08 |
| A8 | 7.6277539E−13 | 3.9861629E−13 | −1.0752697E−09 |
| A10 | −1.5395189E−15 | −7.0290437E−16 | 2.0607529E−11 |
| A12 | 1.8218882E−18 | 6.9775885E−19 | −2.1740445E−13 |
| A14 | −1.2660968E−21 | −3.8853350E−22 | 1.2632571E−15 |

TABLE 6-continued

Example 2

| Surface Number | 5 | 10 | 13 |
|---|---|---|---|
| A16 | 4.7799189E−25 | 1.1026140E−25 | −3.7804840E−18 |
| A18 | −7.5518447E−29 | −1.1636351E−29 | 4.5625097E−21 |

EXAMPLE 3

Figure 5:
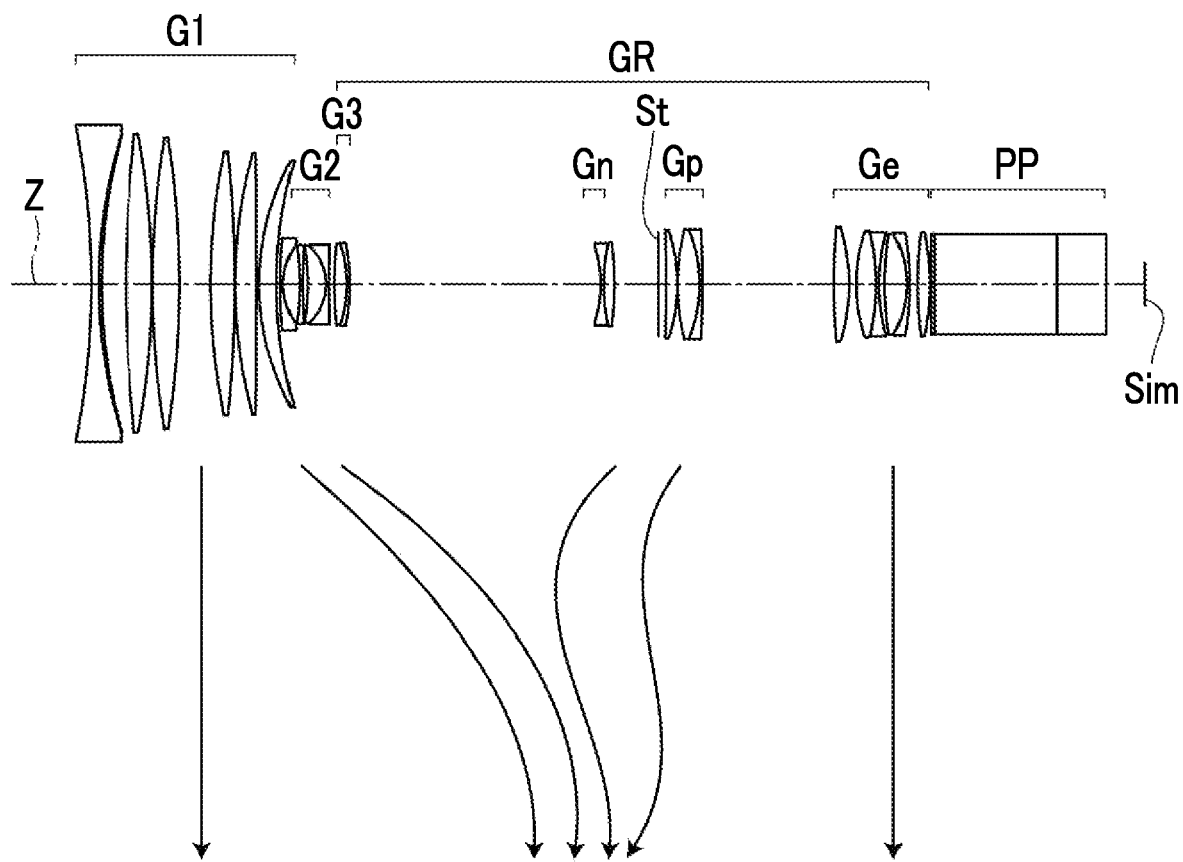
FIG. 5 is a cross-sectional view illustrating a lens configuration and a movement locus of a zoom lens of Example 3 of the present invention at the wide-angle end.
Figure 6:
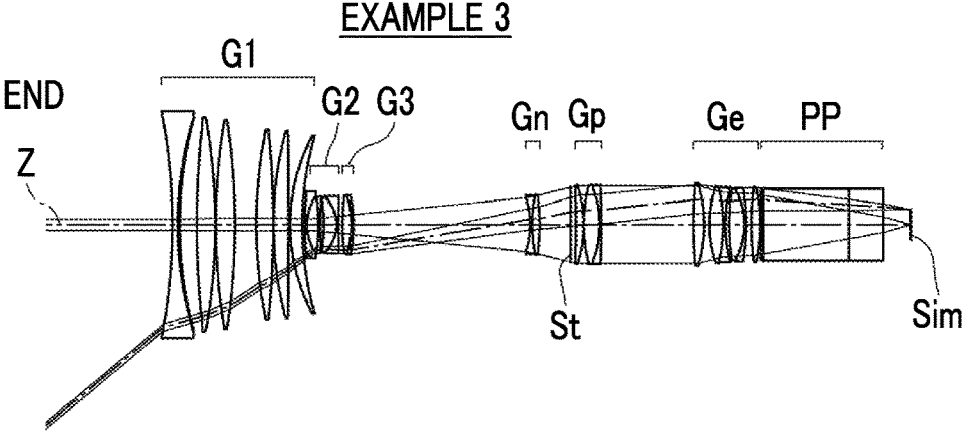
FIG. 6 is a cross-sectional view illustrating a configuration and optical paths of the zoom lens of Example 3 of the present invention at the wide-angle end, the first middle focal length state, the second middle focal length state, and the telephoto end.
Figure 6:
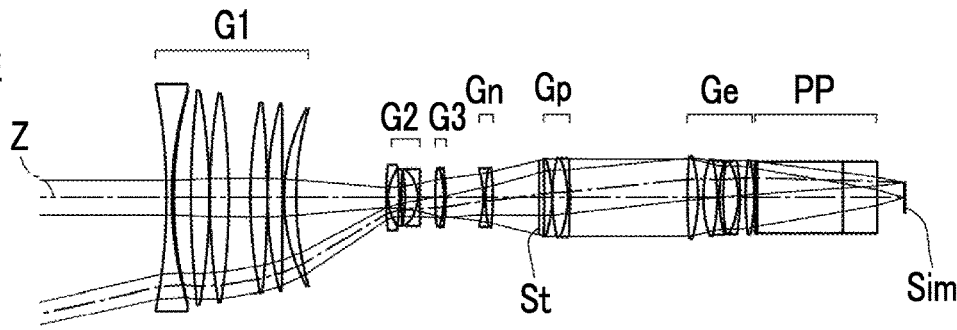
Figure 6:
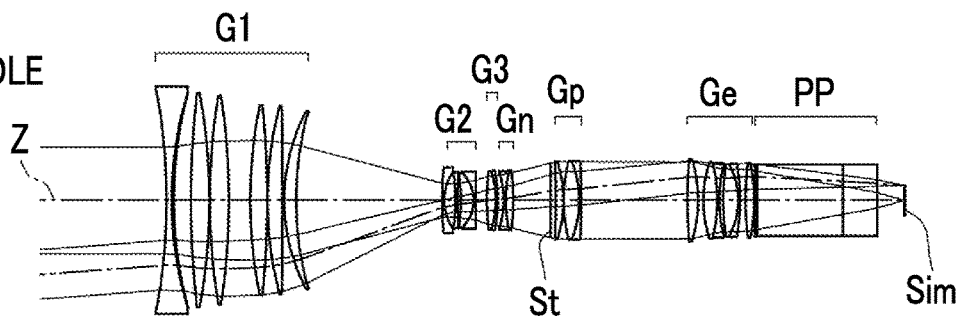
Figure 6:
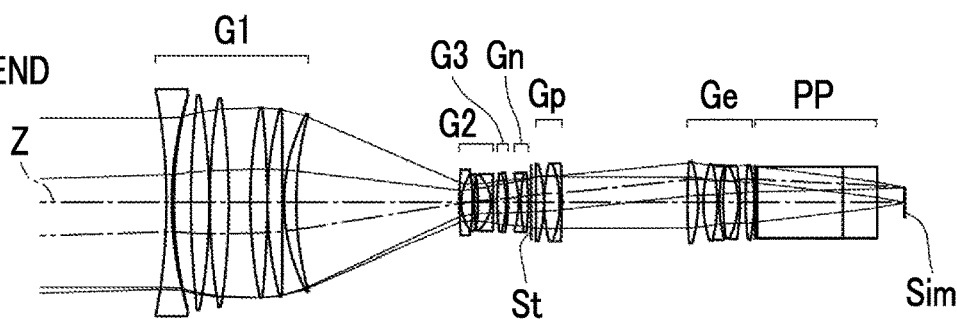
Figure 11:
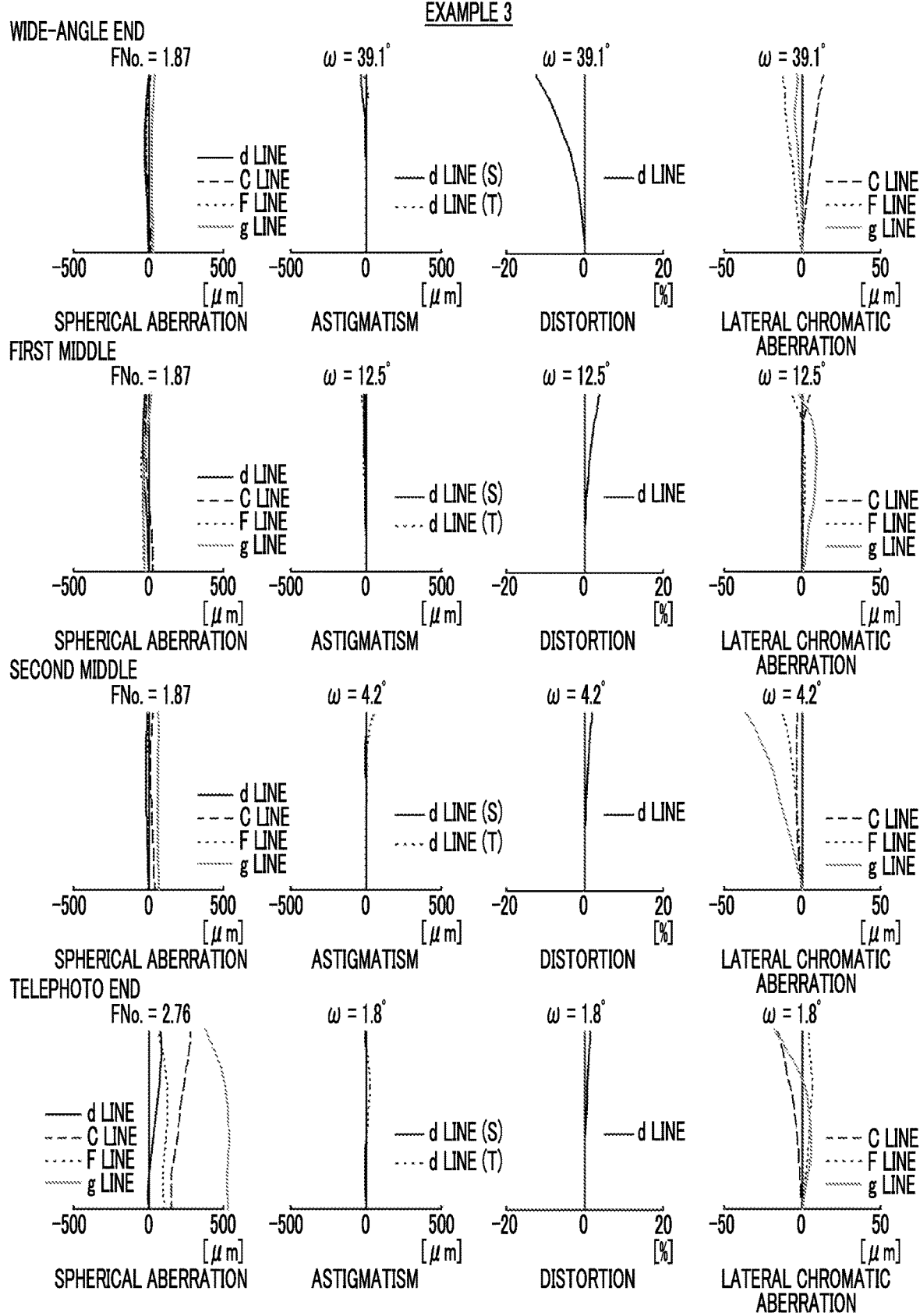
FIG. 11 is a diagram of aberrations of the zoom lens of Example 3 of the present invention.

FIGS. 5 and 6 are cross-sectional views illustrating a lens configuration of the zoom lens of Example 3. The schematic configuration of the zoom lens of Example 3 is the same as that of Example 2. Table 7 shows basic lens data of the zoom lens of Example 3, Table 8 shows specification and variable surface distances, Table 9 shows aspheric coefficients, and FIG. 11 shows aberration diagrams in a state where the object at infinity is in focus.

TABLE 7

Example 3

| Si | Ri | Di | Ndj | vdj | θgFj |
|---|---|---|---|---|---|
| 1 | −218.24337 | 2.000 | 1.73800 | 32.26 | 0.58995 |
| 2 | 134.72947 | 0.828 | 1.62342 | 22.44 | 0.68049 |
| 3 | 152.97471 | 6.535 | | | |
| *4 | 326.63560 | 7.104 | 1.43387 | 95.18 | 0.53733 |
| 5 | −215.15401 | 0.120 | | | |
| 6 | 231.06461 | 7.326 | 1.43387 | 95.18 | 0.53733 |
| 7 | −257.84509 | 8.377 | | | |
| 8 | 178.98490 | 6.458 | 1.43387 | 95.18 | 0.53733 |
| 9 | −346.19950 | 0.120 | | | |
| 10 | 136.19176 | 5.674 | 1.53775 | 74.70 | 0.53936 |
| *11 | −11525.36242 | 0.724 | | | |
| 12 | 70.14769 | 4.601 | 1.72916 | 54.68 | 0.54451 |
| 13 | 120.29784 | DD[13] | | | |
| *14 | 120.71927 | 0.800 | 2.00100 | 29.13 | 0.59952 |
| 15 | 18.40896 | 4.310 | | | |
| 16 | −72.27131 | 0.800 | 1.95375 | 32.32 | 0.59015 |
| 17 | 148.38172 | 1.342 | | | |
| 18 | −60.59069 | 4.886 | 1.89286 | 20.36 | 0.63944 |
| 19 | −14.10729 | 0.800 | 1.95375 | 32.32 | 0.59015 |
| 20 | 791.14922 | DD[20] | | | |
| 21 | 96.71852 | 3.348 | 1.80000 | 29.84 | 0.60178 |
| 22 | −35.06937 | 0.800 | 1.90366 | 31.31 | 0.59481 |
| 23 | −55.23663 | DD[23] | | | |
| 24 | −32.45516 | 0.810 | 1.83400 | 37.21 | 0.58082 |
| 25 | 49.90813 | 2.852 | 1.89286 | 20.36 | 0.63944 |
| 26 | −89.76807 | DD[26] | | | |
| 27(St) | ∞ | 2.000 | | | |
| 28 | −514.00582 | 2.966 | 1.80610 | 40.93 | 0.57141 |
| 29 | −47.25718 | 0.120 | | | |
| 30 | 59.26428 | 5.935 | 1.51633 | 64.14 | 0.53531 |
| 31 | −39.34871 | 0.800 | 1.95375 | 32.32 | 0.59015 |
| 32 | −275.97713 | DD[32] | | | |
| 33 | 157.10215 | 4.145 | 1.58913 | 61.13 | 0.54067 |
| 34 | −51.59830 | 1.984 | | | |
| 35 | 44.43431 | 5.302 | 1.48749 | 70.24 | 0.53007 |
| 36 | −59.60488 | 0.800 | 1.95375 | 32.32 | 0.59015 |
| 37 | 52.09253 | 1.503 | | | |
| 38 | 86.45489 | 5.720 | 1.48749 | 70.24 | 0.53007 |
| 39 | −28.62741 | 0.800 | 1.95375 | 32.32 | 0.59015 |
| 40 | −75.38305 | 2.064 | | | |
| 41 | 103.05816 | 3.348 | 1.69895 | 30.13 | 0.60298 |
| 42 | −65.49039 | 0.300 | | | |
| 43 | ∞ | 1.000 | 1.51633 | 64.14 | 0.53531 |
| 44 | ∞ | 33.000 | 1.60859 | 46.44 | 0.56664 |
| 45 | ∞ | 13.200 | 1.51633 | 64.05 | 0.53463 |
| 46 | ∞ | 10.437 | | | |

TABLE 8

Example 3

|  | Wide-Angle End | First Middle | Second Middle | Telephoto End |
|---|---|---|---|---|
| Zr | 1.0 | 3.1 | 9.5 | 22.2 |
| f | 7.842 | 24.232 | 74.736 | 174.097 |
| FNo. | 1.87 | 1.87 | 1.87 | 2.76 |
| 2ω(°) | 78.2 | 25.0 | 8.4 | 3.6 |
| DD[13] | 0.968 | 34.256 | 55.379 | 61.967 |
| DD[20] | 1.477 | 5.563 | 4.295 | 1.728 |
| DD[23] | 67.336 | 14.313 | 2.274 | 3.990 |
| DD[26] | 11.881 | 17.693 | 14.290 | 1.124 |
| DD[32] | 35.155 | 44.993 | 40.579 | 48.009 |

TABLE 9

Example 3

| Surface Number | 4 | 11 | 14 |
|---|---|---|---|
| KA | 9.8642991E−01 | 1.0000000E+00 | 1.0000000E+00 |
| A4 | −1.2905319E−07 | −1.6005169E−07 | 1.9064115E−07 |
| A6 | 2.9660494E−10 | 2.6490166E−10 | 1.2650789E−08 |
| A8 | −8.5588864E−13 | −8.1538562E−13 | −2.7535894E−10 |
| A10 | 1.5729572E−15 | 1.5750613E−15 | 9.6161993E−13 |
| A12 | −1.7906831E−18 | −1.8746534E−18 | 4.2808537E−14 |
| A14 | 1.2090092E−21 | 1.3271050E−21 | −6.3396129E−16 |
| A16 | −4.4050199E−25 | −5.1131726E−25 | 3.3481687E−18 |
| A18 | 6.6384973E−29 | 8.2521727E−29 | −6.2120297E−21 |

EXAMPLE 4

Figure 7:
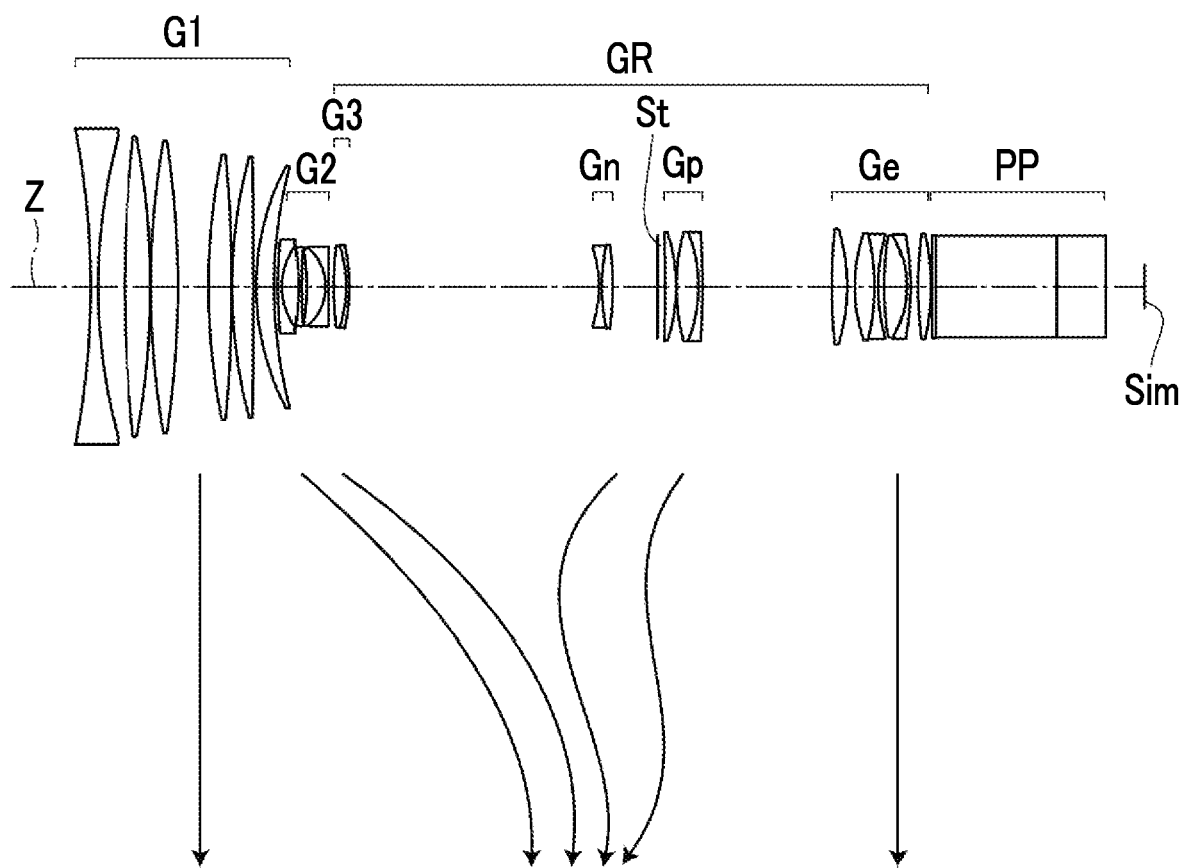
FIG. 7 is a cross-sectional view illustrating a lens configuration and a movement locus of a zoom lens of Example 4 of the present invention at the wide-angle end.
Figure 8:
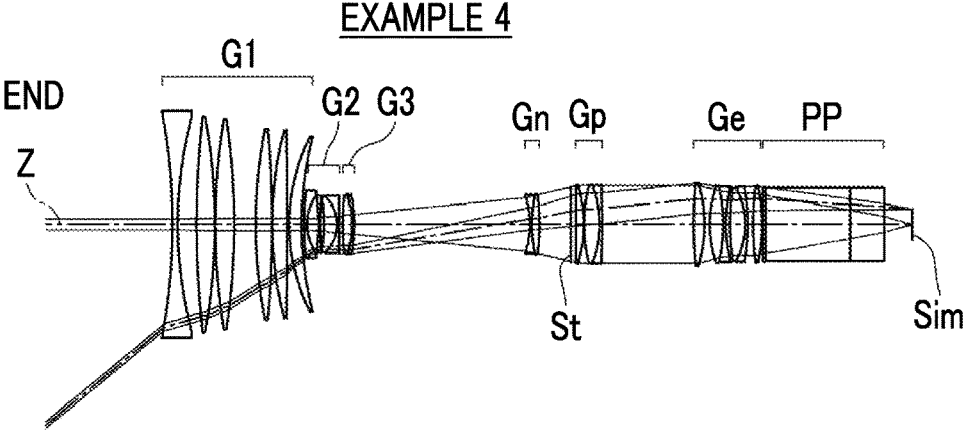
FIG. 8 is a cross-sectional view illustrating a configuration and optical paths of the zoom lens of Example 4 of the present invention at the wide-angle end, the first middle focal length state, the second middle focal length state, and the telephoto end.
Figure 8:
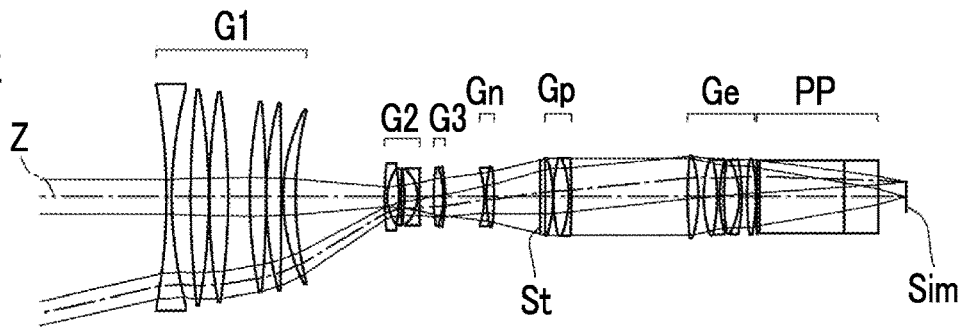
Figure 8:
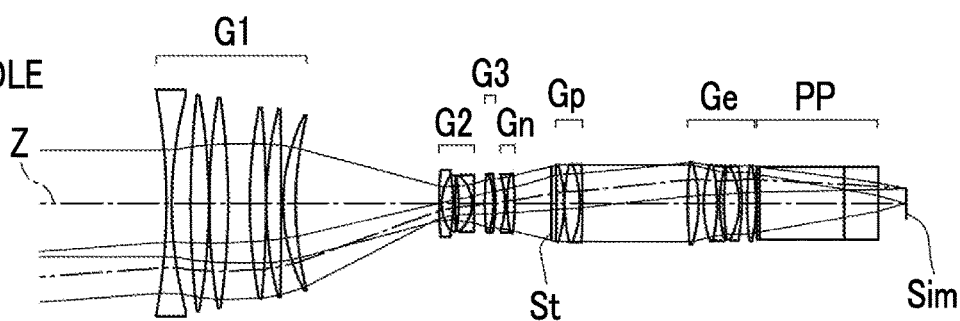
Figure 8:
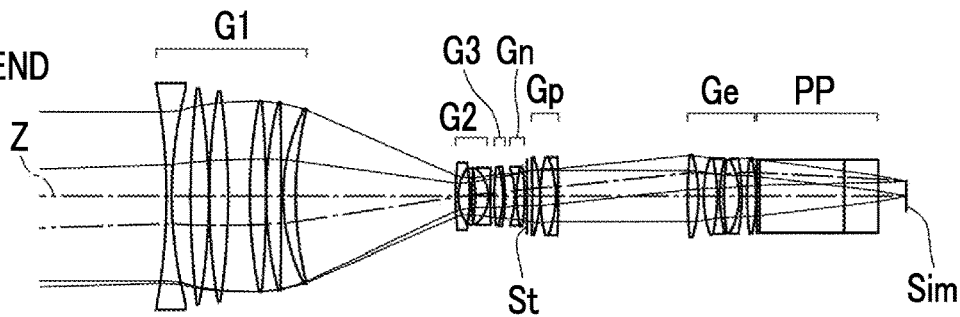
Figure 12:
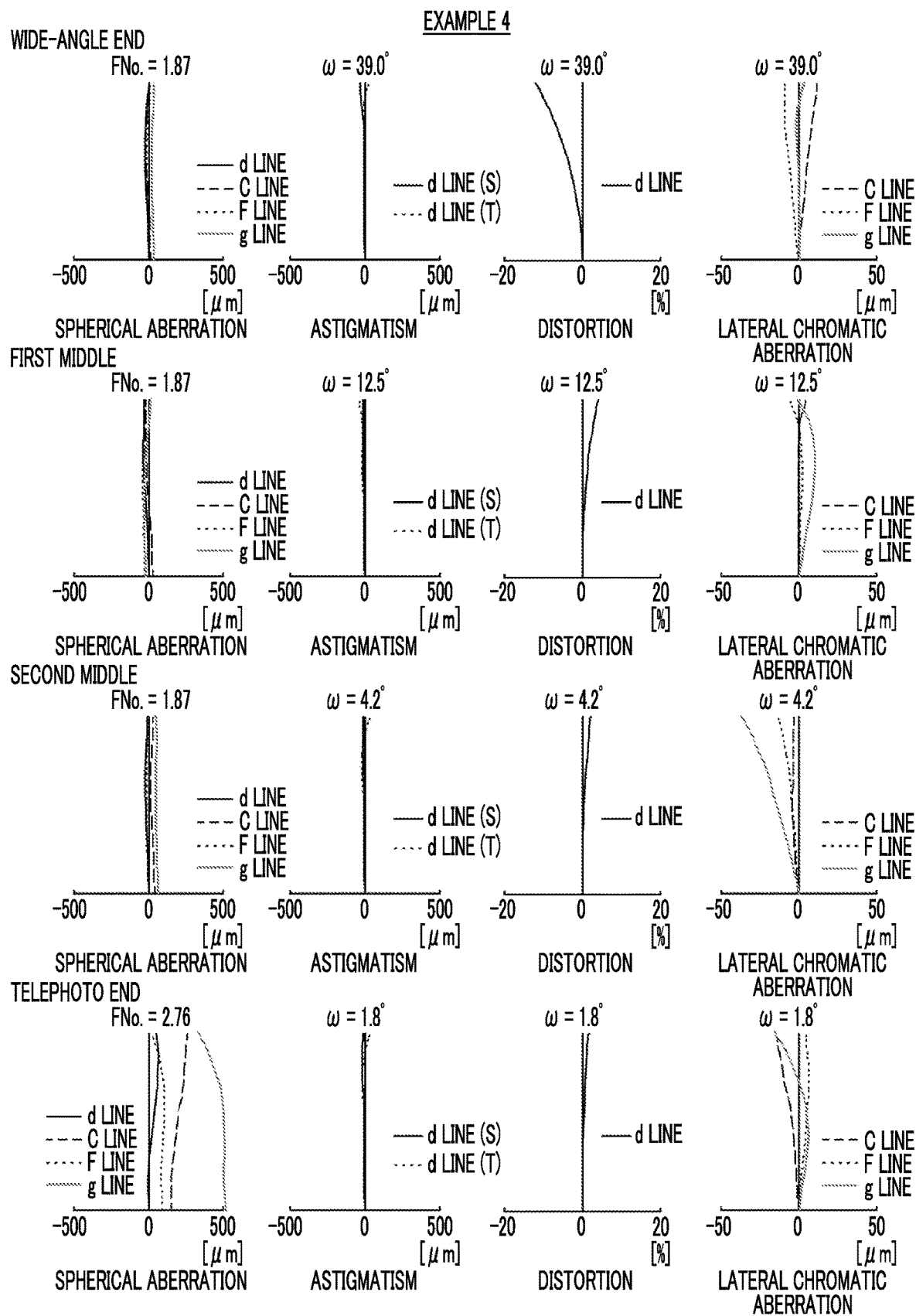
FIG. 12 is a diagram of aberrations of the zoom lens of Example 4 of the present invention.

FIGS. 7 and 8 are cross-sectional views illustrating a lens configuration of the zoom lens of Example 4. The schematic configuration of the zoom lens of Example 4 is the same as that of Example 2. Table 10 shows basic lens data of the zoom lens of Example 4, Table 11 shows specification and variable surface distances, Table 12 shows aspheric coefficients, and FIG. 12 shows aberration diagrams in a state where the object at infinity is in focus.

TABLE 10

Example 4

| Si | Ri | Di | Ndj | νdj | θgFj |
|---|---|---|---|---|---|
| 1 | −221.99105 | 2.000 | 1.73800 | 32.26 | 0.58995 |
| 2 | 153.82299 | 7.269 |  |  |  |
| *3 | 333.81451 | 7.052 | 1.43387 | 95.18 | 0.53733 |
| 4 | −222.16917 | 0.120 |  |  |  |
| 5 | 234.03532 | 7.326 | 1.43387 | 95.18 | 0.53733 |
| 6 | −263.28530 | 8.312 |  |  |  |
| 7 | 182.00720 | 6.277 | 1.43387 | 95.18 | 0.53733 |
| 8 | −387.65597 | 0.120 |  |  |  |
| 9 | 140.32708 | 5.686 | 1.53775 | 74.70 | 0.53936 |
| *10 | −4833.80060 | 0.800 |  |  |  |
| 11 | 71.03770 | 4.813 | 1.72916 | 54.68 | 0.54451 |
| 12 | 129.42846 | DD[12] |  |  |  |
| *13 | 123.16141 | 1.060 | 2.00100 | 29.13 | 0.59952 |
| 14 | 18.53891 | 4.360 |  |  |  |
| 15 | −71.63236 | 0.800 | 1.95375 | 32.32 | 0.59015 |
| 16 | 149.45259 | 1.339 |  |  |  |
| 17 | −62.00475 | 5.076 | 1.89286 | 20.36 | 0.63944 |
| 18 | −13.96697 | 0.800 | 1.95375 | 32.32 | 0.59015 |
| 19 | 790.57975 | DD[19] |  |  |  |
| 20 | 97.85985 | 3.357 | 1.80000 | 29.84 | 0.60178 |
| 21 | −35.30657 | 0.800 | 1.90366 | 31.31 | 0.59481 |
| 22 | −55.64107 | DD[22] |  |  |  |
| 23 | −32.34886 | 0.810 | 1.83400 | 37.21 | 0.58082 |
| 24 | 49.34590 | 2.938 | 1.89286 | 20.36 | 0.63944 |
| 25 | −87.84128 | DD[25] |  |  |  |
| 26(St) | ∞ | 2.000 |  |  |  |
| 27 | −498.95776 | 2.965 | 1.80610 | 40.93 | 0.57141 |
| 28 | −47.36962 | 0.120 |  |  |  |
| 29 | 59.00053 | 5.937 | 1.51633 | 64.14 | 0.53531 |
| 30 | −39.48375 | 1.000 | 1.95375 | 32.32 | 0.59015 |
| 31 | −301.88912 | DD[31] |  |  |  |
| 32 | 154.58070 | 4.182 | 1.58913 | 61.13 | 0.54067 |
| 33 | −51.57208 | 2.000 |  |  |  |
| 34 | 44.51777 | 5.325 | 1.48749 | 70.24 | 0.53007 |
| 35 | −59.55806 | 1.000 | 1.95375 | 32.32 | 0.59015 |
| 36 | 52.22024 | 1.585 |  |  |  |
| 37 | 85.44256 | 5.876 | 1.48749 | 70.24 | 0.53007 |
| 38 | −28.58618 | 1.000 | 1.95375 | 32.32 | 0.59015 |
| 39 | −75.90931 | 2.022 |  |  |  |
| 40 | 104.79341 | 3.496 | 1.69895 | 30.13 | 0.60298 |
| 41 | −64.87358 | 0.300 |  |  |  |
| 42 | ∞ | 1.000 | 1.51633 | 64.14 | 0.53531 |
| 43 | ∞ | 33.000 | 1.60859 | 46.44 | 0.56664 |
| 44 | ∞ | 13.200 | 1.51633 | 64.05 | 0.53463 |
| 45 | ∞ | 10.437 |  |  |  |

TABLE 11

Example 4

|  | Wide-Angle End | First Middle | Second Middle | Telephoto End |
|---|---|---|---|---|
| Zr | 1.0 | 3.1 | 9.5 | 22.2 |
| f | 7.876 | 24.337 | 75.060 | 174.850 |
| FNo. | 1.87 | 1.87 | 1.87 | 2.76 |
| 2ω(°) | 78.0 | 25.0 | 8.4 | 3.6 |
| DD[12] | 1.000 | 34.069 | 54.778 | 61.156 |
| DD[19] | 1.399 | 5.517 | 4.161 | 1.479 |
| DD[22] | 67.445 | 15.054 | 3.637 | 3.693 |
| DD[25] | 12.126 | 17.783 | 14.106 | 1.050 |
| DD[31] | 35.000 | 44.547 | 40.289 | 49.592 |

TABLE 12

Example 4

| Surface Number | 3 | 10 | 13 |
|---|---|---|---|
| KA | 9.8642991E−01 | 1.0000000E+00 | 1.0000000E+00 |
| A4 | −4.6911322E−08 | −8.7045665E−08 | 9.6934359E−07 |
| A6 | −3.4472394E−11 | 2.1581089E−11 | −1.8184817E−08 |
| A8 | −2.7479552E−14 | −2.3439371E−13 | 5.8870530E−10 |
| A10 | 2.8811990E−16 | 7.1599881E−16 | −1.3037015E−11 |
| A12 | −5.5226095E−19 | −1.0858589E−18 | 1.6872782E−13 |
| A14 | 4.8981188E−22 | 8.9026630E−22 | −1.2306581E−15 |
| A16 | −2.1113824E−25 | −3.7802256E−25 | 4.6592171E−18 |
| A18 | 3.5704113E−29 | 6.5350697E−29 | −7.1110553E−21 |

Table 13 shows the corresponding values of Conditional Expressions (1) to (7) of the zoom lenses of Examples 1 to 4 and the values of fw, fm1, (fw×ft)$^{1/2}$, fm2, and ft. The values shown in Table 13 are based on the d line.

TABLE 13

| Expression Number | Conditional Expression | Example 1 | Example 2 | Example 3 | Example 4 |
|---|---|---|---|---|---|
| (1) | DG1/Dwm1 | 3.840 | 4.041 | 5.079 | 5.224 |
| (2) | f1/fL1 | −0.749 | −0.722 | −0.701 | −0.637 |
| (3) | NL1 − Navelp < 0.26 | 0.191 | 0.214 | 0.224 | 0.224 |
| (4) | TL/ft | 1.432 | 1.477 | 1.525 | 1.528 |
| (5) | frw/fw | 5.125 | 5.375 | 5.354 | 5.338 |
| (6) | vn − vp | 18.74 | 16.06 | 16.85 | 16.85 |
| (7) | vavelp | 73.70 | 78.00 | 82.98 | 82.98 |
|  | fw | 7.875 | 7.877 | 7.842 | 7.876 |
|  | fm1 | 24.334 | 24.339 | 24.232 | 24.337 |
|  | $(fw \times ft)^{1/2}$ | 37.105 | 37.113 | 36.950 | 37.110 |
|  | fm2 | 75.051 | 75.066 | 74.736 | 75.060 |
|  | ft | 174.829 | 174.865 | 174.097 | 174.850 |

As can be seen from the above data, in the zoom lens of Examples 1 to 4, the zoom ratio is 22.2, the high zoom ratio is ensured, reduction in size and weight is achieved, and various aberrations are satisfactorily corrected in the entire zoom range, whereby high optical performance is achieved.

Figure 13:
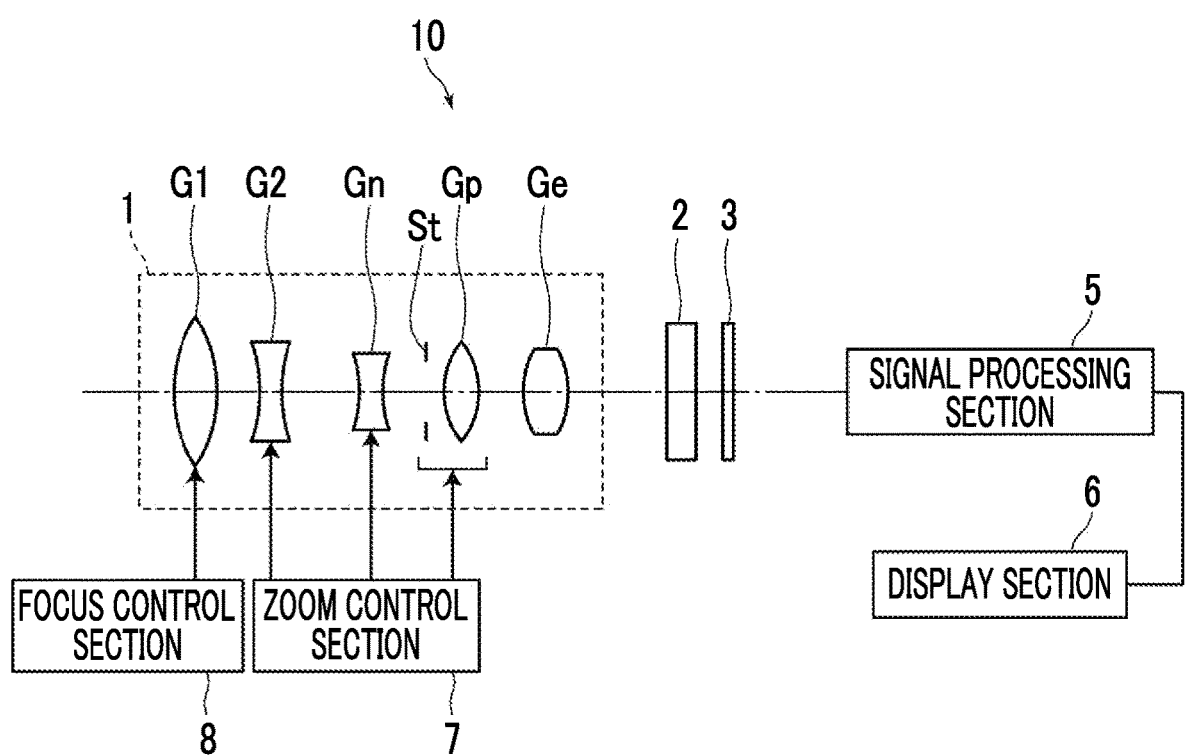
FIG. 13 is a schematic configuration diagram of an imaging apparatus according to an embodiment of the present invention.

Next, an imaging apparatus according to an embodiment of the present invention will be described. FIG. 13 is a schematic configuration diagram of an imaging apparatus 10 using the zoom lens 1 according to the above-mentioned embodiment of the present invention as an example of an imaging apparatus of an embodiment of the present invention. Examples of the imaging apparatus 10 include a movie imaging camera, a broadcast camera, a movie imaging camera, a digital camera, a video camera, a surveillance camera, and the like.

The imaging apparatus 10 comprises a zoom lens 1, a filter 2 which is disposed on the image side of the zoom lens 1, and an imaging element 3 which is disposed on the image side of the filter 2. FIG. 13 schematically shows the first lens group G1, the second lens group G2, the negative lens group Gn, the aperture stop St, the positive lens group Gp, and the final lens group Ge comprised by the zoom lens 1. However, the number of lens groups included in the zoom lens 1 of FIG. 13 is an example, and the imaging apparatus of the present invention can be formed of a number of lens groups different from that in the example of FIG. 13.

The imaging element 3 captures an optical image, which is formed through the zoom lens 1, and converts the image into an electrical signal. For example, charge coupled device (CCD), complementary metal oxide semiconductor (CMOS), or the like may be used. The imaging element 3 is disposed such that the imaging surface thereof is coplanar with the image plane of the zoom lens 1.

The imaging apparatus 10 also comprises a signal processing section 5 which performs calculation processing on an output signal from the imaging element 3, a display section 6 which displays an image formed by the signal processing section 5, a zoom control section 7 which controls zooming of the zoom lens 1, and a focus control section 8 which controls focusing of the zoom lens 1. It should be noted that FIG. 13 shows only one imaging element 3, but the imaging apparatus of the present invention is not limited to this, and may be a so-called three-plate imaging apparatus having three imaging elements.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspheric coefficient of each lens are not limited to the values shown in the numerical examples, and different values may be used therefor.

What is claimed is:

1. A zoom lens consisting of, in order from an object side to an image side:

a first lens group that has a positive refractive power and remains stationary with respect to an image plane during zooming;

a second lens group that has a negative refractive power and moves during zooming; and a subsequent lens group that has a distance between the subsequent lens group and the second lens group in a direction of an optical axis changing during zooming, wherein the first lens group has at least one positive lens, and a negative lens is disposed to be closest to the object side in the first lens group, the subsequent lens group comprises, successively in order from a position closest to the image side to the object side, a final lens group that has a positive refractive power and remains stationary with respect to an image plane during zooming, a positive lens group that moves during zooming, a stop that moves integrally with the positive lens group during zooming, and a negative lens group that moves by changing a distance between the negative lens group and the stop in the direction of the optical axis during zooming, the stop first moves to the object side and thereafter reversely moves to the image side along the optical axis in a case of zooming from a wide-angle end to a telephoto end, assuming that a distance on the optical axis from a lens surface closest to the object side in the first lens group to a lens surface closest to the image side in the first lens group is DG1 and an amount of movement of the stop in the direction of the optical axis from the wide-angle end to a first middle focal length state in a case where the first middle focal length state is a state where the stop reversely moves is Dwm1, Conditional Expression (1) is satisfied:

$$3 < DG1/Dwm1 < 6 \tag{1}.$$

2. The zoom lens according to claim 1, wherein assuming that a focal length of the first lens group is f1 and a focal length of the negative lens closest to the object side in the first lens group is fL1, Conditional Expression (2) is satisfied:

$$-0.8 < f1/fL1 < -0.6 \tag{2}.$$

3. The zoom lens according to claim 1, wherein assuming that a refractive index of the negative lens closest to the object side in the first lens group at a d line is NL1 and an average of refractive indices of all positive lenses in the first lens group at the d line is Nave1p, Conditional Expression (3) is satisfied:

$$0.11 < NL1 - Nave1p < 0.26 \qquad (3).$$

4. The zoom lens according to claim 1, wherein assuming that a focal length of the whole system at the first middle focal length state is fm1, a focal length of the whole system at the wide-angle end is fw, and a focal length of the whole system at the telephoto end is ft, the following relationship is satisfied:

$$Fw < fm1 < (fw \times ft)^{1/2}.$$

5. The zoom lens according to claim 1, wherein assuming that a sum of a distance on the optical axis from a lens surface closest to the object side to a lens surface closest to the image side and an air-converted distance on the optical axis from the lens surface closest to the image side to the image plane is TL and a focal length of the whole system at the telephoto end is ft, Conditional Expression (4) is satisfied:

$$1 < TL/ft < 1.36 \qquad (4).$$

6. The zoom lens according to claim 1, wherein assuming that a composite focal length of the negative lens group, the positive lens group, and the final lens group at the wide-angle end is frw, and a focal length of the whole system at the wide-angle end is fw, Conditional Expression (5) is satisfied:

$$4.5 < frw/fw < 6 \qquad (5).$$

7. The zoom lens according to claim 1, wherein focusing is performed by moving at least one lens in the first lens group.

8. The zoom lens according to claim 1, wherein the negative lens group consists of a negative lens and a positive lens in order from the object side.

9. The zoom lens according to claim 8, wherein assuming that an Abbe number of the negative lens of the negative lens group at the d line is vn and an Abbe number of the positive lens of the negative lens group at the d line is vp, Conditional Expression (6) is satisfied:

$$10 < vn - vp < 25 \qquad (6).$$

10. The zoom lens according to claim 1, wherein the stop first moves to the image side and reversely moves to the object side along the optical axis during zooming from the first middle focal length state to the telephoto end.

11. The zoom lens according to claim 10, wherein assuming that a focal length of the whole system in a case where the stop reversely moves from the image side to the object side is fm2, a focal length of the whole system at the wide-angle end is fw, and a focal length of the whole system at the telephoto end is ft, the following relationship is satisfied:

$$(fw \times ft)^{1/2} < fm2 < ft.$$

12. The zoom lens according to claim 1, wherein the first lens group has three or more positive lenses.

13. The zoom lens according to claim 1, wherein
the subsequent lens group consists of the final lens group, the positive lens group, the stop and the negative lens group, or consists of the final lens group, the positive lens group, the stop, the negative lens group and another lens group which is configured such that a distance between the another lens group and the negative lens group changes during zooming.

14. The zoom lens according to claim 1, wherein assuming that an average of Abbe numbers of all positive lenses of the first lens group at the d line is vave1p, Conditional Expression (7) is satisfied:

$$67 < vave1p < 90 \qquad (7).$$

15. The zoom lens according to claim 1, wherein Conditional Expression (1-1) is satisfied:

$$3.5 < DG1/Dwm1 < 5.5 \qquad (1\text{-}1).$$

16. The zoom lens according to claim 2, wherein Conditional Expression (2-1) is satisfied:

$$-0.78 < f1/fL1 < -0.62 \qquad (2\text{-}1).$$

17. The zoom lens according to claim 3, wherein Conditional Expression (3-1) is satisfied:

$$0.15 < NL1 - Nave1p < 0.24 \qquad (3\text{-}1).$$

18. The zoom lens according to claim 5, wherein Conditional Expression (4-1) is satisfied:

$$1.2 < TL/ft < 1.56 \qquad (4\text{-}1).$$

19. The zoom lens according to claim 9, wherein Conditional Expression (6-1) is satisfied:

$$15 < vn - vp < 20 \qquad (6\text{-}1).$$

20. An imaging apparatus comprising the zoom lens according to claim 1.

* * * * *